US006962661B2

(12) United States Patent
Northup, Jr. et al.

(10) Patent No.: US 6,962,661 B2
(45) Date of Patent: Nov. 8, 2005

(54) LIQUID—LIQUID EXTRACTION APPARATUS AND METHOD

(75) Inventors: Aldrich Holt Northup, Jr., Katy, TX (US); Michael Robert Resetarits, Depew, NY (US); Neil Anthony Sandford, Wichita, KS (US); Pamela Jo Tokerud, Wichita, KS (US); Gary Wayne Gage, Grand Prairie, TX (US); Veada Colic, Dallas, TX (US)

(73) Assignee: Kellogg Brown & Root, Inc., Houston, TX (US)

( * ) Notice: Subject to any disclaimer, the term of this patent is extended or adjusted under 35 U.S.C. 154(b) by 0 days.

(21) Appl. No.: 10/605,027

(22) Filed: Sep. 2, 2003

(65) Prior Publication Data

US 2005/0045558 A1 Mar. 3, 2005

(51) Int. Cl.[7] .............................................. B01D 11/00
(52) U.S. Cl. ................... 210/634; 196/14.52; 208/317; 210/511; 422/256
(58) Field of Search ............................ 210/511, 532.1, 210/634; 196/14.52; 422/256, 257; 202/158; 208/317, 339, 322

(56) References Cited

U.S. PATENT DOCUMENTS

| 2,647,856 | A | * | 8/1953 | Grunewald et al. ......... 208/317 |
| 3,632,315 | A | * | 1/1972 | Uitti et al. .................. 422/256 |
| 3,899,299 | A | * | 8/1975 | Bushnell et al. ............ 422/256 |
| 4,247,521 | A | * | 1/1981 | Forte et al. ................. 422/256 |
| 4,511,537 | A | * | 4/1985 | Fiocco et al. ............... 422/256 |
| 4,528,068 | A | * | 7/1985 | Fiocco et al. ............ 196/14.52 |
| 4,588,563 | A | * | 5/1986 | Fiocco ....................... 422/256 |
| 5,047,179 | A | * | 9/1991 | Nye ........................ 261/114.1 |
| 5,049,319 | A | * | 9/1991 | Nye ........................ 261/114.1 |

* cited by examiner

*Primary Examiner*—Joseph Drodge
(74) *Attorney, Agent, or Firm*—Lundeen & Dickenson, L.L.P.; Bradley A. Misley

(57) ABSTRACT

Method and apparatus for contacting two liquid phases for liquid-liquid extraction in a vertical extraction vessel. A relatively heavier liquid phase, descending the extraction vessel at a relatively low volumetric flow rate, is dispersed into a continuous phase comprising a relatively lighter liquid rising through the extraction vessel at a relatively high flow rate. Sieve trays are provided with adjustable active areas and overlapping manways for personnel access.

40 Claims, 14 Drawing Sheets

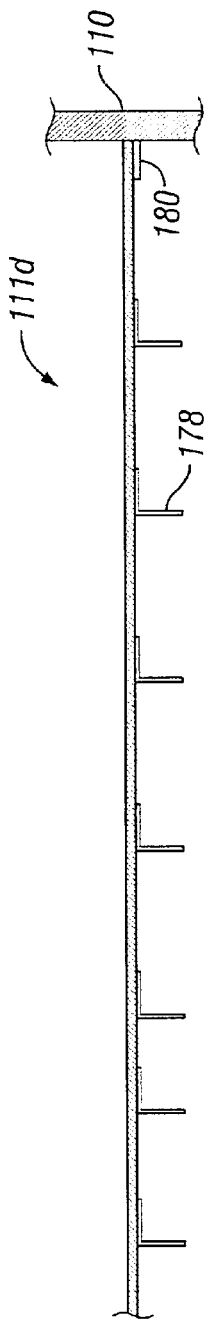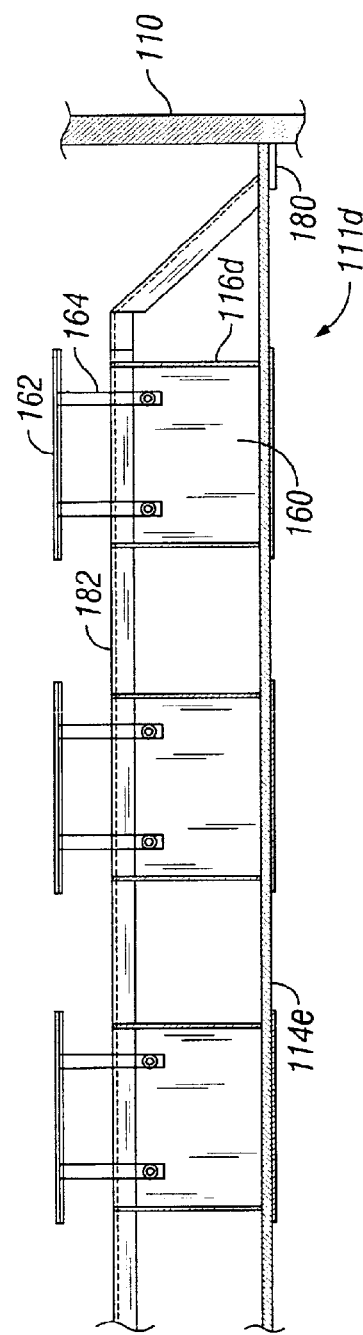
FIG. 19
FIG. 20

LIQUID— LIQUID EXTRACTION APPARATUS AND METHOD

BACKGROUND OF INVENTION

The present invention relates to liquid-liquid extraction involving the dispersion of a relatively heavier liquid phase in a relatively lighter liquid phase, at elevated ratios of flow rates of light phase to heavy phase. The present invention also relates to mechanical improvements in liquid-liquid extraction equipment.

In a typical form, liquid-liquid extraction processes perform mass transfer of target components from one liquid phase into a second liquid phase, typically to selectively recover valued components or eliminate undesirable components from one phase. The liquid phase containing the components to be extracted is called raffinate. The liquid phase that will extract the target components is called solvent, and when the solvent has completed the extraction, the solvent phase is called extract.

In liquid-liquid extraction applications, two liquid phases are characterized by, among other properties, different relative solubilities of the target components being extracted, and different bulk densities. The two liquid phases must be brought into intimate contact with each other to make the mass transfer process efficient. A typical method of achieving intimate liquid-liquid contact entails breaking up a light liquid phase into small droplets and dispersing those droplets into a heavy liquid that is sustained as a continuous phase. This can be achieved using, for example, perforated sieve trays arranged successively in a preferably vertical liquid-liquid extraction vessel. In such a system the light and heavy liquids are typically introduced near bottom and top ends, respectively, of the extraction vessel, and the liquids flow countercurrently past and through one another because of differing respective liquid weights.

Prior-art liquid-liquid extraction applications in sieve tray systems typically disperse the light liquid phase as droplets, as the light phase rises through sieve tray perforations. The light phase droplets pass through a continuous, heavy liquid phase above each sieve tray. This physical arrangement can be appropriate for applications in which light-phase flow rates are roughly equal to or substantially lower than heavy phase flow rates. The practice of dispersing a rising light phase also has been particularly favored to minimize maintenance and capacity problems associated with solids that may settle out of either liquid phase and block tray perforations by coming to rest on the tray surfaces.

U.S. Pat. No. 4,247,521 to Forte et al discloses a method of liquid-liquid extraction in terms of applications to systems characterized by substantial excess in the flow of the heavy phase over that of the light phase. Forte et al also features increasing tray riser complexity as vessel and tray diameter increase.

U.S. Pat. Nos. 5,047,179 and 5,049,319 to Nye address increasing active sieve tray area while also adding to vapor flow area to promote phase disengagement in vapor-liquid applications such as distillation. This can improve both fluid throughput capacities and vapor-liquid contact efficiency, for net gains in unit capacity and separation effectiveness.

Bravo et al, "Sulfolane® RDC Tray Revamp," AIChE Meeting, Chicago, Ill., November 1996, presents a case of retrofitting a liquid-liquid extraction vessel to replace the internals of a rotating disc contactor (RDC) with fixed sieve trays having five upcomers per tray.

Zhu et al, "Hydrodynamic and Mass Transfer Performance of Multiple Upcomer Extraction Trays," Canadian Journal of Chemical Engineering, August 1997, describes laboratory work investigating operation of sieve trays with three upcomers (risers).

Each of the above patents and references is hereby incorporated by reference in its entirety.

In the particular case of deasphalting lubricating oils, a rotating disc contactor (RDC) has been commonly used. RDC's have evidenced operating problems such as backmixing or premature flooding, which can be caused by excessive shear of the rotating discs that can create too fine a dispersal of process liquids. Results of very fine dispersion in a liquid-liquid extraction unit can include internal recirculation or entrainment of the dispersion. Both phenomena reduce extraction efficiency and capacity. Lube oil deasphalting typically operates at elevated pressures that may equal or exceed supercritical pressure, and RDC's have been prone to seal leakage where disc drive shafts penetrate the extraction vessels. In a number of RDC units seal leakage has been stopped or limited by welding the disc drive shaft seals, thus abandoning any advantages of agitation to enhance extractive mass transfer, and thereby limiting such columns to perform either at reduced throughput or reduced separation, or both.

Liquid capacity, extraction efficiency, and product yield of RDC units are affected by excessive shear, with the potential impacts of light-phase backmixing and/or heavy-phase entrainment. Both phenomena interfere with phase separation and cause unproductive secondary phase contact, thus reducing extraction efficiency. One way to counteract backmixing and entrainment is to reduce liquid throughput rates, allowing added residence time for phase separation, but also reducing column capacity. Any of the three results i.e. operating with backmixing or entrainment, or operating at reduced liquid capacity reduces product yield.

SUMMARY OF INVENTION

We have discovered a liquid-liquid extraction method and apparatus achieving intimate contact between two liquid phases by passing a relatively heavier liquid phase descending through perforated sieve trays in a liquid-liquid extraction vessel. The sieve trays generate droplets of the heavy liquid and disperse the heavy liquid droplets into a continuous, relatively lighter ascending liquid phase. This invention is designed to handle liquid traffic at varying flow rates and, in particular, it can pass a substantial excess of the light-phase flow rate compared to the heavy-phase flow rate. Another aspect of this invention addresses potential plugging of sieve tray perforations, both by proportionally slowing a rate of loss of tray perforation area and by facilitating restoration of degraded perforation area.

This invention offers mechanical, operating, and economic improvements for sieve trays, as used in liquid-liquid extraction. Mechanical tray configuration is simplified, especially for large-diameter extraction vessels. Sieve trays can be provided with supplemental active area, and/or adjustable blanking strips as flow control elements that enable liquid throughput capacities to vary more widely with stable operation than prior art designs are capable of. The invention can facilitate prolonged operation between major cleaning turnarounds plus rapid, thus economical, cleaning and maintenance.

A key feature in one embodiment of this invention is simplified access, wherein manway panels in sieve trays are more or less in alignment with one another, which can facilitate movement of personnel and materials during entry into a vessel. The invention also is particularly well suited to retrofit applications to improve performance and reliability of existing extraction units. Of note, retrofit candidates include units using mechanical internals such as rotating disc contactors (RDC's) and passive packing systems, and typically high-fouling services such as deasphalting of lubricating oil (lube oil) feedstocks can be beneficially converted to use the methods of this invention.

One embodiment of the invention is a liquid-liquid extraction vessel having a cylindrical shell with an inside diameter of at least 1.5 m and an array of sieve trays vertically spaced in the shell. There is a perforated deck in each tray, and a single riser or a pair of parallel risers. The risers have top and bottom sections, and the bottom section has a cross-sectional flow area larger than a cross-sectional flow area of the top section. An exterior manway is formed in a wall of the vessel adjacent to at least one of the trays. A manway hatch is formed in the perforated deck of each tray for personnel access to each of the trays. The manway hatches in each tray preferably overlap in plan with a manway hatch in an adjacent tray.

The risers can be alternating peripheral single-pass risers, alternating midsection-peripheral two-pass risers, or alternating midsection-peripheral three-pass risers. The vessel can also include blanking strips removably or adjustably secured to the perforated decks. The perforated decks can be assembled from a plurality of panels. The risers can include a perforated restriction plate between the top and bottom sections.

In another embodiment the invention provides a liquid-liquid extraction method for contacting a relatively heavy liquid phase with a relatively light liquid phase. The method includes introducing a feed stream of the heavy phase at an upper inlet of a liquid-liquid extraction vessel comprising a plurality of successive, vertically arrayed trays including at least one perforated deck per tray and at least one riser per tray. The risers include respective top and bottom sections, and the bottom riser sections have larger transverse cross-sectional areas than respective top riser sections. The method includes introducing a feed stream of the light phase into a lower inlet of the extraction vessel at a volumetric flow rate greater than that of the heavy phase. The heavy phase is passed through perforations in the decks of successive trays to disperse droplets of the heavy phase into respective cross-flow zones below the decks. The heavy phase is collected on respective upper surfaces of the successive decks. The light phase is passed through respective cross-flow zones into adjacent disengagement zones and through the respective risers to discharge into succeeding cross-flow zones.

The method can also include contacting the heavy and light phases above an uppermost one of the trays by distributing the heavy-phase feed stream adjacent the upper inlet across an upper distribution zone, passing the light phase upwardly from the at least one riser of the uppermost tray to countercurrently contact the heavy phase in the upper distribution zone, passing the light phase upwardly from the upper distribution zone into an ultimate disengaging zone to separate heavy-phase droplets into the upper distribution zone, and discharging the light phase essentially free of entrained heavy phase as an effluent from an upper outlet of the extraction vessel in communication with the disengaging zone.

The method can similarly include contacting the heavy and light phases below a lowermost one of the trays by distributing the light-phase feed stream adjacent the lower inlet across a lower distribution zone, passing the heavy phase downwardly from the lowermost tray into the lower distribution zone to countercurrently contact the light phase in the lower distribution zone, passing the heavy phase downwardly from the lower distribution zone to an accumulation zone to coalesce the heavy phase, and discharging the heavy phase lean in entrained light phase as an effluent from a lower outlet of the extraction vessel in communication with the accumulation zone.

The upward flow of the light phase through respective trays can be constrained with flow restrictions in the risers. The flow restrictions can be a restrictive cross-sectional area of the at least one top riser of the tray, or a perforated restrictor plate between the top and bottom riser sections. The method preferably includes alternating the configuration of the risers on the successive trays. The risers can be single-pass peripheral risers, midsection-peripheral two-pass risers, or midsection-peripheral three-pass risers.

The ratio of the volumetric flow rates of the light phase feed to the heavy phase feed is greater than 1:1, preferably greater than 1.5:1, more preferably from 5:1 to 15:1, and especially from 6:1 to 10:1. The heavy liquid phase can be solvent and the light liquid phase a raffinate, or the heavy liquid phase raffinate and the light liquid phase solvent. In one particular embodiment of the method, the heavy-phase feed stream is lubricating oil feedstock containing asphaltenes, the light-phase feed stream is a solvent selected from aliphatic or cycloaliphatic hydrocarbons having from 3 to 5 carbon atoms, and the ratio of the volumetric flow rates of the light phase to the heavy phase is in a range from 6:1 to 10:1.

In one preferred embodiment of the method, removable blanking strips are secured to the tray decks to block a first portion of the tray perforations and leave a second portion of the perforations unobstructed for said heavy phase passage. When needed or desired to increase the rate of the heavy phase, at least one of the blanking strips is removed to pass the heavy phase through unobstructed perforations of the first portion. Additionally or alternatively, adjustable blanking strips are secured to the tray decks to selectively block and unblock at least a portion of the tray perforations, and adjusted to increase or reduce the rate of passage of the heavy phase through the respective portions of the tray perforations.

Another embodiment of the invention provides a liquid-liquid extraction unit for contacting a heavy liquid phase with a light liquid phase. The unit includes means for introducing a feed stream of the heavy phase for downward flow at a volumetric flow rate entering an upper inlet of a liquid-liquid extraction vessel comprising a plurality of successive, vertically-arrayed trays including at least one perforated deck per tray and at least one riser per tray. The risers include respective top and bottom sections, wherein the bottom riser sections have larger transverse cross-sectional areas than respective top riser sections. The unit also includes means for introducing a feed stream of the light phase into a lower inlet of the extraction vessel, for upward flow as a continuous phase at a volumetric flow rate greater than the heavy phase flow rate, means for passing the heavy phase through perforations in the decks of successive trays to disperse droplets of the heavy phase into respective cross-flow zones below the decks, means for collecting the heavy phase on respective upper surfaces of the successive trays, and means for passing the light phase through respective cross-flow zones into adjacent tray disengagement zones and through the respective risers to discharge into succeeding cross-flow zones.

A further embodiment of the invention provides a liquid-liquid extraction vessel. The vessel has an upper inlet to the extraction vessel to introduce a feed stream of a heavy phase at a volumetric flow rate, and a plurality of successive, vertically-arrayed trays including at least one perforated deck per tray and at least one riser per tray. The risers include respective top and bottom sections. The bottom riser sections have larger transverse cross-sectional areas than respective top riser sections. The tray is imperforate in an area of the riser bounded between attachments of the respective top and bottom riser sections to the tray. A lower inlet to the extraction vessel is provided to introduce a feed stream of a light phase at a greater volumetric flow rate than the heavy phase. Perforations in the tray decks pass the heavy phase downward and disperse droplets of the heavy phase into a continuum of the light phase. Cross-flow zones are provided below the respective tray decks to pass the heavy-phase droplets downwardly therethrough. Collection zones are provided below the respective cross-flow zones to coalesce the heavy-phase droplets on respective upper surfaces of successive decks. The vessel has disengagement zones under the bottom sections of the risers to receive the light-phase from the cross-flow zones and disengage entrained heavy phase droplets.

The vessel can have an upper distributor in communication with the upper inlet to distribute the heavy phase feed stream in the extraction vessel, an upper distribution zone adjacent the upper distributor to contact the heavy and light phases in counter-current flow above an uppermost one of the trays, an ultimate disengaging zone above the upper distribution zone to separate droplets of heavy phase from the light phase, and an upper outlet in communication with the disengaging zone to discharge light phase effluent from the extraction vessel. Similarly, the vessel can also include a lower distributor in communication with the lower inlet to distribute the light phase in the extraction vessel, a lower distribution zone adjacent the lower distributor to contact the heavy and light phases in counter-current flow below a lowermost one of the trays, an accumulation zone disposed below the lower distribution zone to coalesce the heavy-phase droplets, and a lower outlet in communication with the accumulation zone to discharge heavy-phase effluent from the extraction vessel.

The vessel can also include flow restrictions in the risers to constrain the upward flow of light phase through respective trays. The restrictions can be a restrictive cross-sectional area of the top risers, or a perforated horizontal restrictor plate disposed in each riser. The risers can have directional passages to direct the flow of the light phase from the riser top sections laterally into respective cross-flow zones. The directional passages can be a horizontal slot formed between a transverse cap attached above an open-ended riser stack and a top edge of the open riser. Alternatively, the directional passages can be a plurality of side-facing openings in a vertical wall of a closed-ended riser stack. The risers can be single-pass peripheral risers alternatingly disposed between opposite sides on the successive trays, or midsection-peripheral two-pass or three-pass risers alternatingly disposed on the successive trays.

The vessel can also include blanking strips removably secured to the perforated deck surfaces to selectively block portions of the perforations, or adjustably secured to the perforated deck surfaces to selectively block and unblock portions of the perforations. Further, the vessel can include personnel access hatches in the perforated tray decks wherein access panels of adjacent trays overlap in plan.

Furthermore, the present invention in another embodiment provides a method for converting a rotating disc contactor to a sieve tray liquid-liquid extraction unit. Existing extraction vessel internal components from the rotating disc contactor are selectively removed. The internals can be trays, packing, rotating discs, agitating internals, upper and lower feed distributors, or the like. At least one tray is installed that includes at least one perforated deck and at least one riser, wherein the risers include respective top and bottom sections, the bottom riser sections have larger transverse cross-sectional areas than respective top riser sections, and the trays are imperforate in an area of the riser bounded between attachments of the respective top and bottom riser sections to the tray.

BRIEF DESCRIPTION OF DRAWINGS

FIG. 19 is a cross-sectional view along the lines 19—19 of FIG. 16, showing an elevation of the tray to illustrate tray deck panels and tray supports in section.

FIG. 20 is a cross-sectional view along the lines 20—20 of FIG. 17, showing an elevation through a lateral riser and riser panel supports.

DETAILED DESCRIPTION

Figure 1:
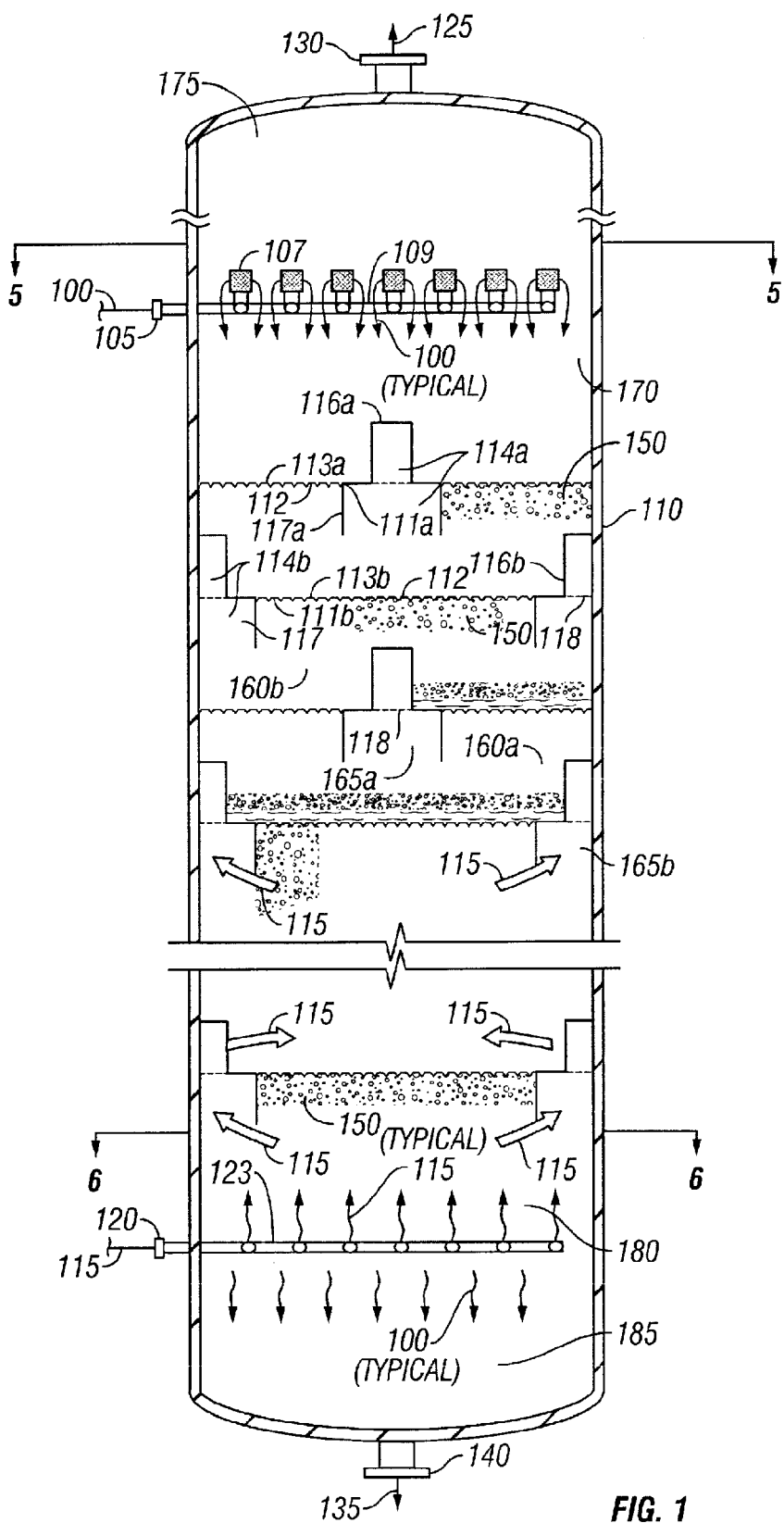
FIG. 1 is a simplified cut-away elevation of an extraction vessel with an alternating midsection-peripheral two-pass riser arrangement according to an embodiment of the present invention.

In the figures, where like elements refer to like numbers, FIG. 1 shows an embodiment of the present invention in a preferred arrangement of internals of an extraction vessel 110, depicting generally the flow and control of the heavy and light liquid phases.

The extraction vessel 110 comprises a plurality of successive, horizontal trays 111a, 111b of alternating configurations, vertically spaced between an upper vessel inlet 105 for a heavy-phase feed 100 and a lower vessel inlet 120 for a light-phase feed 115. Both configurations of the trays 111a, 111b include respective decks 113a, 113b with at least one area on each deck having perforations 112. The decks 113a, 113b are intersected by corresponding vertically aligned risers 114a, 114b, respectively. An upper vessel outlet 130 for a light-phase effluent 125 is connected through a top wall of the vessel 110, and a lower vessel outlet 140 for a heavy-phase effluent is connected through a bottom wall of the vessel 110.

An upper distribution zone 170 is disposed above an uppermost one of the trays 111a (or 111b). An upper distributor 109 is connected to the upper inlet 105, and has a plurality of distribution devices 107 arrayed across a horizontal section of the vessel 110 adjacent the upper distribution zone 170. An ultimate disengaging zone 175, in communication with the upper outlet 130, is disposed above the upper distribution zone 170 and the upper distributor 109. A lower distribution zone 180 is disposed below a lowermost one of the trays 111a (or 111b) adjacent the lower inlet 120. A lower distributor 123 is attached to the lower inlet 120 and oriented across a horizontal section of the vessel 110 adjacent the lower distribution zone 180. An accumulation zone 185, in communication with the lower outlet 140, is disposed below the lower distribution zone 180.

The heavy liquid feed 100 enters the vessel 110 via the upper inlet 105, and the heavy-phase effluent 135 discharges from the lower outlet 140. The light liquid feed 115 enters the lower inlet 120, and the light-phase effluent 125 discharges from the upper outlet 130. The heavy phase 100 and the light phase 115 are substantially immiscible, and flow past and through one another in traversing the extraction vessel 110. In passing through the vessel 110, the heavy-phase liquid 100 is dispersed beginning with discharge from the distribution heads 107 of the upper distributor 109. The heavy liquid 100 passes through the perforations 112 in successive tray decks 113a, 113b. The perforations 112 in sieve tray decks 113a, 113b disperse the descending heavy-phase liquid as droplets 150 beneath each tray 111a, 111b. Concurrently, the light-phase liquid 115 is distributed across the vessel section beginning with discharge from the lower distributor 123. The light phase liquid 115 passes horizontally beneath respective trays 111a, 111b, rising past trays 111a, 111b via the respective intersecting risers 114a, 114b.

The light and heavy-phase effluents 125, 135 collect and discharge as follows. The light phase 115 flows upwardly through the extraction vessel 110, the trays 111a (or 111b), and into the ultimate disengaging zone 175. There a majority of entrained heavy-phase droplets 150 settle back downward into the upper distribution zone 170. Substantially free of entrained heavy phase droplets 150, the light phase 115 discharges as effluent stream 125 via the upper outlet 130. The heavy phase flows downward, progressively dispersing through and coalescing on trays 111a, 111b. Droplets 150 from the lowermost tray 111b (or 111a) pass through the lower distribution zone 180 and coalesce in the accumulation zone 185 as a continuous heavy phase effluent 135. The heavy phase effluent 135 discharges via the lower vessel outlet 140.

Figure 2:
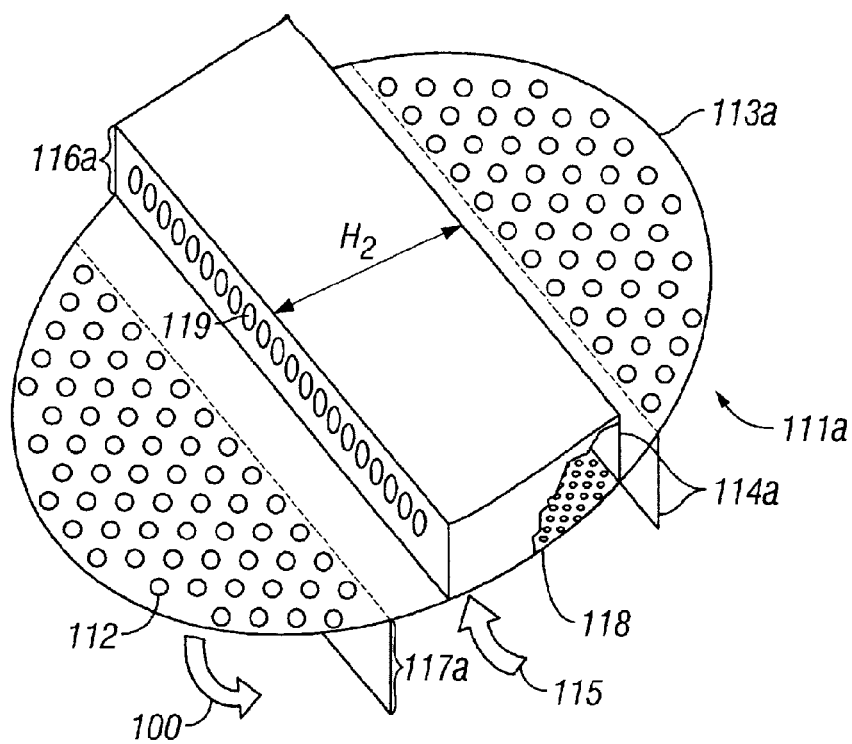
FIG. 2 represents a two-pass sieve tray 111$a$ from the extraction vessel of FIG. 1 in schematic perspective and partially cut away with a central riser according to an embodiment of the invention.
Figure 3:
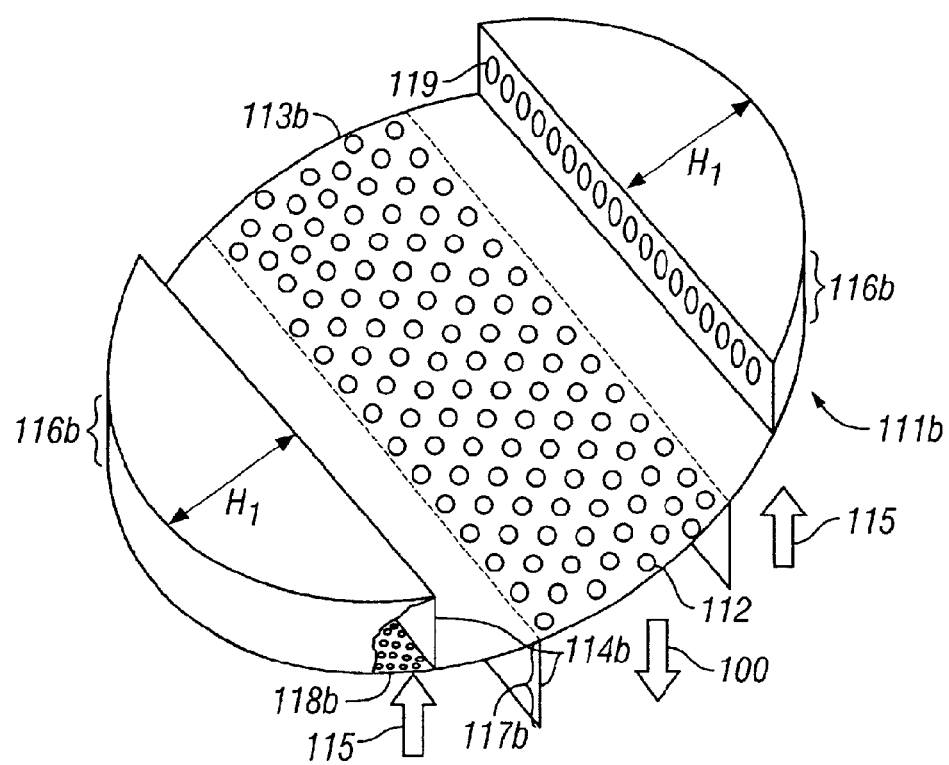
FIG. 3 represents two-pass sieve tray 111$b$ from the extraction vessel of FIG. 1 in schematic perspective and partially cut away with peripheral risers according to an embodiment of the invention.

FIGS. 2 and 3 provide perspective views of tray configurations 111a and 111b, respectively. The risers 114a, 114b comprise top riser sections 116a, 116b and connected bottom riser sections 117a, 117b, respectively. The bottom riser sections 117a, 117b have larger transverse cross-sectional areas than the adjoining top riser sections 116a, 116b. Adjoining the perforated area of each respective tray deck 113a, 113b, a restrictor plate 118 connects each bottom riser section 117a, 117b to a corresponding top riser section 116a, 116b through the respective tray deck 113a, 113b. The decks 113a, 113b are imperforate above the bottom riser section 117a, 117b in an area outside the top riser section 116a, 116b. Openings 119 in vertical walls of the top riser sections 116a, 116b direct the flow of light phase 115 toward the bottom riser sections 117a, 117b of succeeding trays 111a, 111b in an upward flow path of the light phase 115. The restrictor plates 118 successively limit flow rates of light phase 115 through the risers 114a, 114b of each tray 111a, 111b, facilitating stable flow distribution through the vessel. The plates 118 aid the disentrainment of heavy-phase droplets 150 from the light phase to control heavy-phase recirculation.

Figure 4:
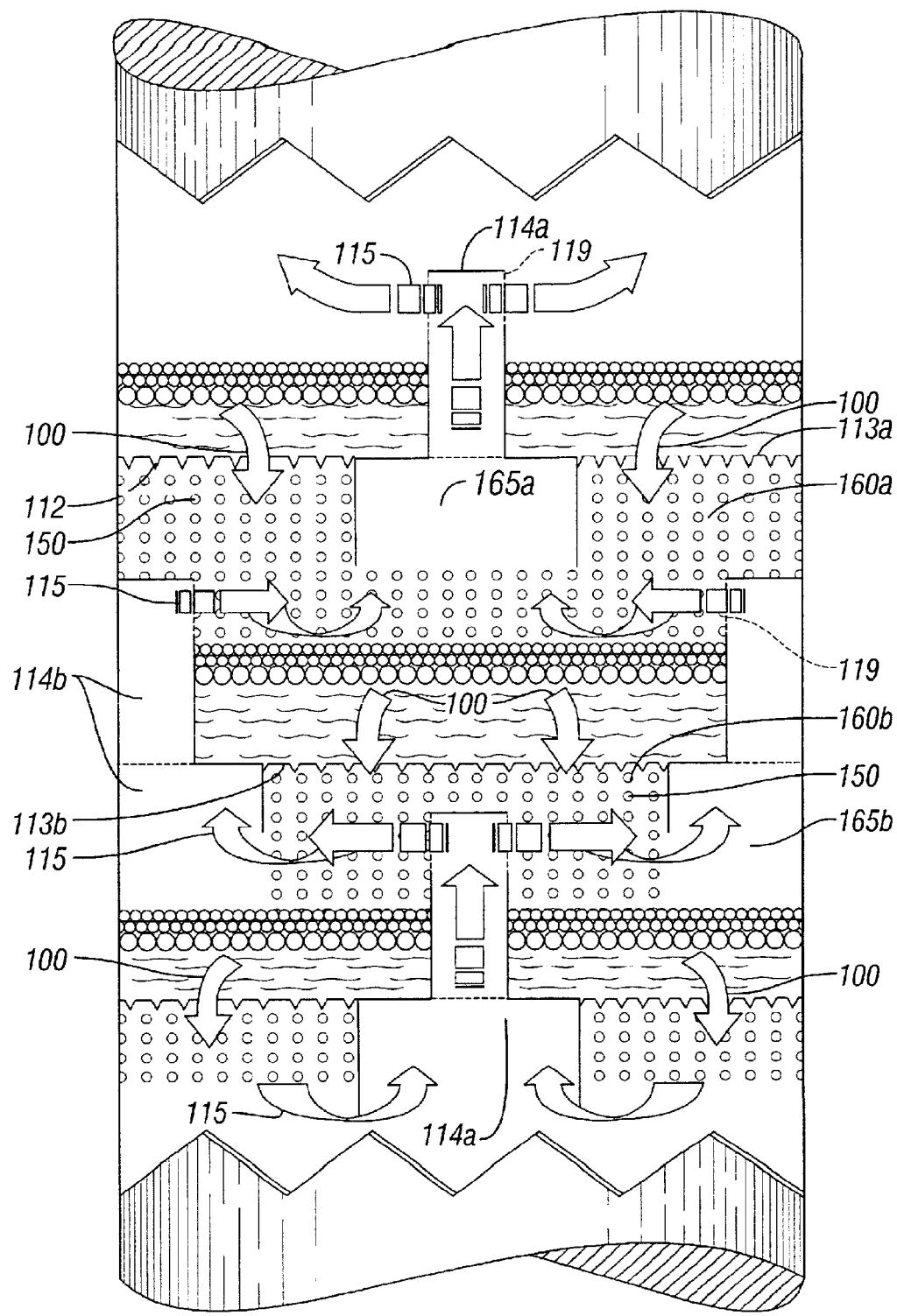
FIG. 4 shows simplified configurations of sieve trays and flow paths in an extraction vessel with the sieve trays of FIGS. 2–3.

With reference to FIG. 4, the light phase 115 moves upward through the extraction vessel 110 and traverses successive cross-flow zones 160a, 160b below respective perforated decks 113a, 113b. Exiting the cross-flow zones 160a, 160b, the light phase 115 passes into adjacent disengagement zones 165a, 165b under respective bottom riser sections 117a, 117b. Moving up the risers 114a, 114b, the light phase 115 discharges from the openings 119 in the top riser sections 116a, 116b, and traverses succeeding cross-flow zones 160a, 160b.

Flowing generally counter to the passage of the light phase 115, the heavy phase 100 passes downward, dispersed by tray perforations 112 as droplets 150 into the successive cross-flow zones 160a, 160b. At each succeeding tray 111a, 111b, droplets 150 collect and tend to coalesce on upper surfaces of the respective decks 113a, 113b. The coalescing permits light phase liquid 115 entrained with the heavy-phase droplets 150 to separate and avoid being recirculated downward through tray perforations 112. The heavy-phase droplets 150 pass through the successive cross-flow zones 160a, 160b and downwardly out of a lowermost cross-flow zone below the lowermost tray.

The present invention aligns single risers 114a on selected trays 111a in central positions along the middle areas of the respective trays 11a. On alternate selected trays 111b, a pair of peripherally disposed tray risers 114b are offset horizontally from the middle areas of the respective trays 111b, and oriented in parallel with respect to the single risers 114a. The positions of tray risers 114a, 114b are thus alternated from tray midsection or preferably center to off-center or preferably peripheral on successive trays 111a, 111b, respectively. This alternation of positions directs the flow of the light phase 115 through successive cross-flow zones 160a, 160b, in turn, more or less transversely inward and then transversely outward from the central risers 114a in succession. As used herein, the number of passes of a riser arrangement refers to the number of cross-flow zones separated by risers in each tray, e.g. two in the case of the FIG. 1 embodiment.

The perforations 112 on the tray decks 113a, 113b are of a size and number to pass the heavy phase 100 at the desired volumetric flow rate, dispersing the heavy phase 100 into droplets 150. Droplet sizes can be consistently formed in a range of diameters by sizing the perforations 112. Selecting a droplet sizing range and number of perforations 112 on the tray decks 113 enables extraction to operate over a range of flow rates of the heavy phase 100.

Figure 5:
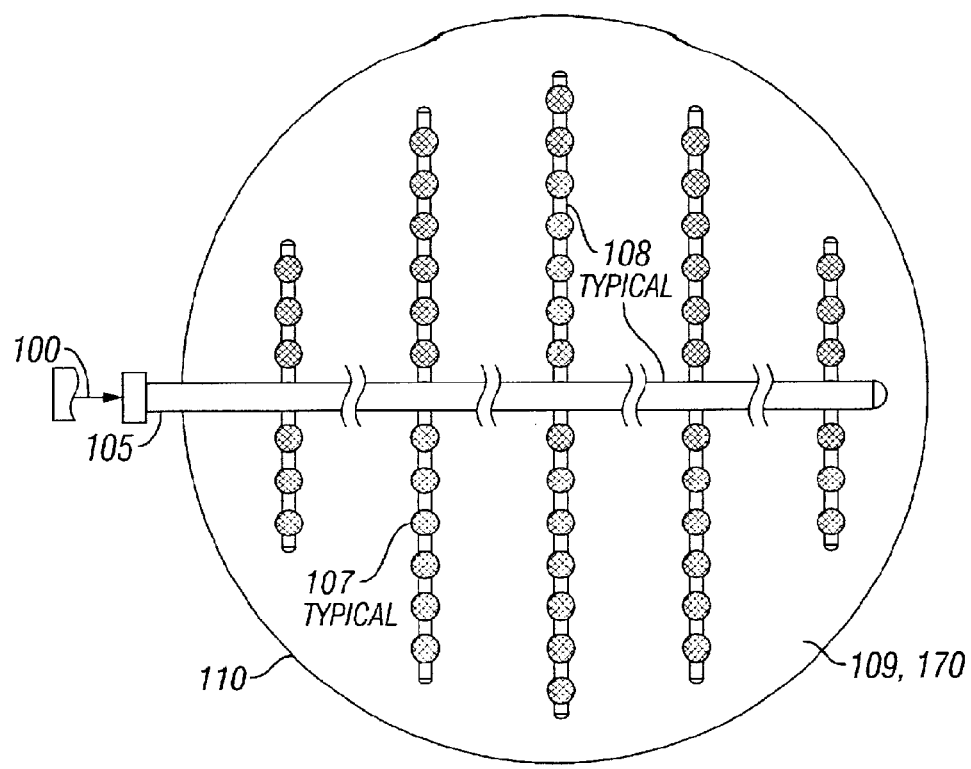
FIG. 5 is a cross-section from FIG. 1 as seen along the lines 5—5, showing an embodiment of the upper distributor.
Figure 6:
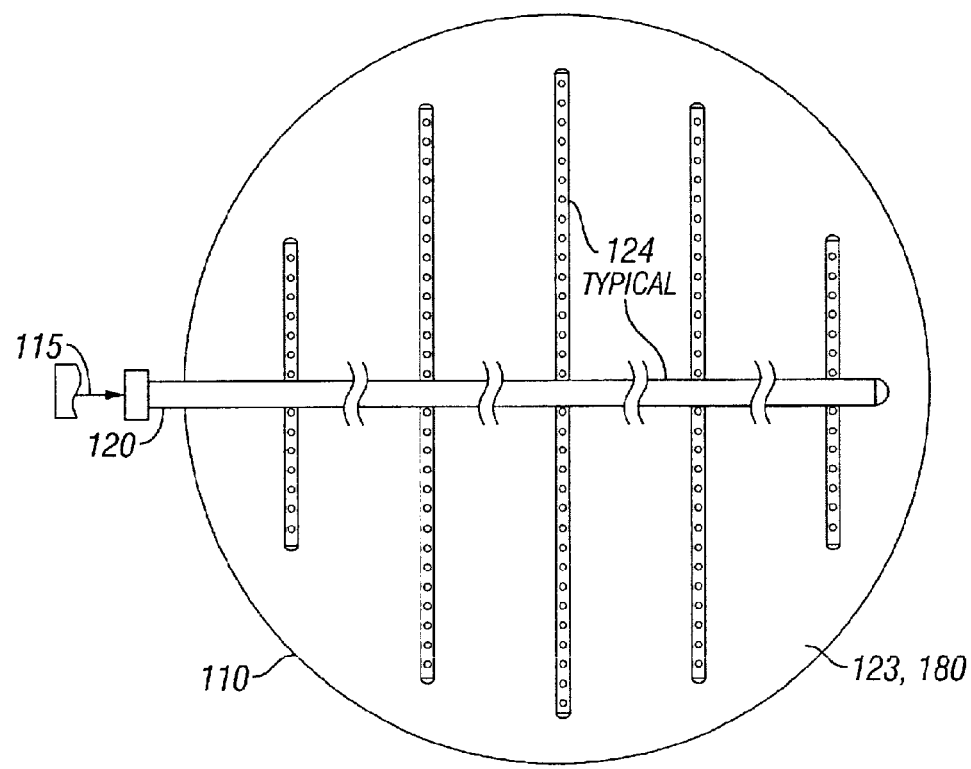
FIG. 6 is a cross-section from FIG. 1 as seen along the lines 6—6, showing an embodiment of the lower distributor.

FIG. 5 illustrates a configuration of the upper distributor 109 as a ladder configuration of piping segments 108 and attached distribution heads 107, sized to proportionally distribute the volumetric flow of the heavy liquid 100 across the upper distribution zone 170 shown in FIG. 1. FIG. 6 depicts the lower distributor 123 as preferably a ladder configuration of perforated piping segments 124 to distribute the volumetric flow of the light phase. The light-phase feed stream 115 enters via the extraction vessel lower inlet 120 beneath the lowermost tray 11a, 111b, and the lower distributor 123 distributes the light phase across the lower distribution zone 180.

One embodiment of the present invention addresses tendencies for some process liquid combinations to form deposits on trays 111a, 111b, for example in "dirty" services such as solvent deasphalting of lube oil feedstocks. Deposits accumulating over tray perforations 112 progressively reduce flow capacity for the heavy phase 100 by occluding available perforation area. Occlusions can be formed by fouling materials such as scale comprising sediment, precipitation, corrosion, or combinations thereof. Accordingly, a surplus of perforations 112 is preferably designed into the respective tray decks 113a, 113b to provide capacity to compensate for a loss of perforation area. However, excessive total active perforation area can cause a loss of control of liquid flow rates and poor phase separation. Therefore, the total active perforation area is positively managed in this embodiment.

Figure 7:
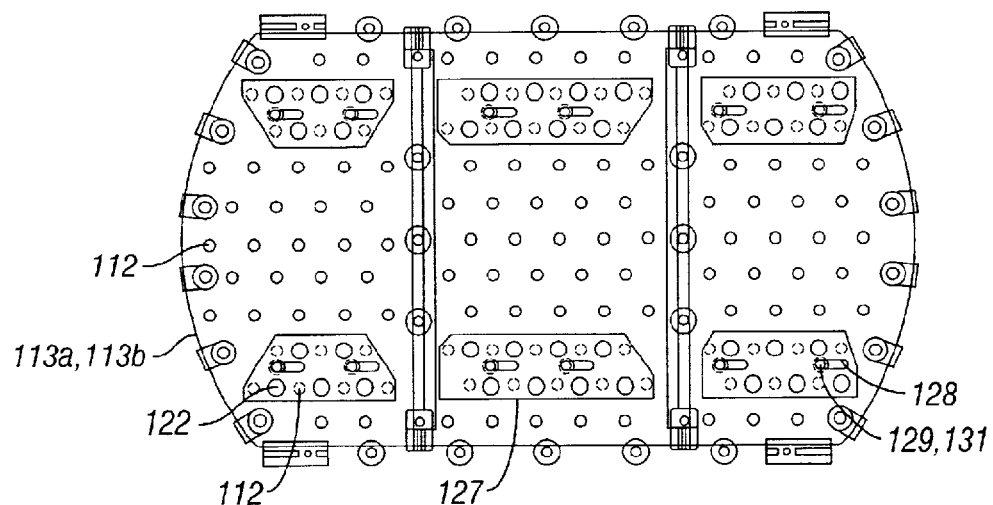
FIG. 7 shows a perforated tray deck in plan according to an embodiment of the invention with blanking strips in position to occlude some of the perforations.
Figure 8:
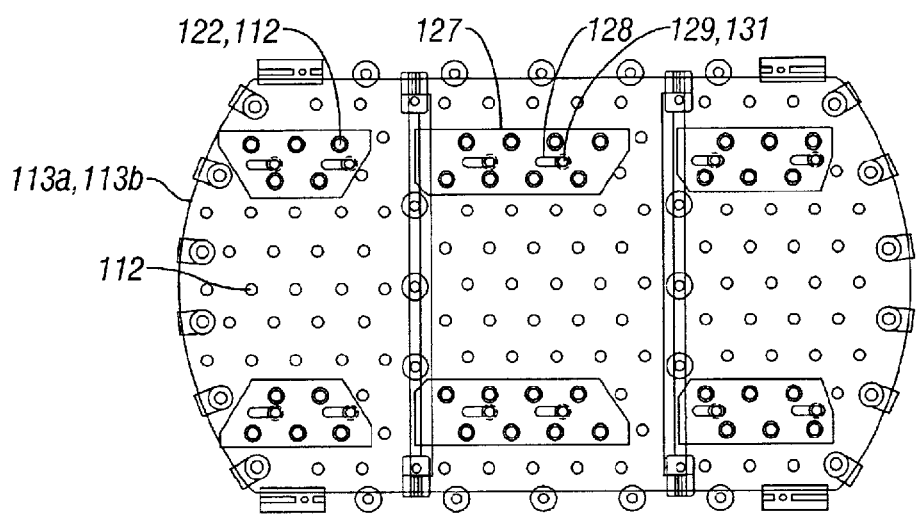
FIG. 8 shows the perforated tray deck of FIG. 7 with the blanking strips moved to allow use of the perforations that were occluded in FIG. 7.

As shown in FIGS. 7–8, a plurality of blanking strips 127 are adjustably secured on the tray decks. The strips 127 can selectively uncover or cover surplus areas of perforations 112 provided. The blanking strips 127 encompass a distributed portion of the total perforations 112 of the tray decks 113a, 113b, preferably in a range of 20 to 50 percent of total deck perforated area. A plurality of positioning slots 128 are provided as cutouts in each blanking strip 127. Mounting holes 129 for the blanking strips 127 also penetrate the tray decks 113a, 113b, and hold-down fasteners 131 are concentrically joined, e.g. by threaded engagement, through the slots 128 and mounting holes 129 to secure the strips 127 to the decks 113a, 113b in a variable positioning pattern.

FIGS. 7–8 depict a plurality of blanking strips 127 in closed position and open position, respectively. The tray perforations 112 under a continuous part of the strips 127 appear "closed" in FIG. 7. In "open" position in FIG. 8, the perforations 122 in each strip 127 have been moved into alignment to fully expose a matching pattern of the tray perforations 112 by sliding the strip 127 via the slots 128 after releasing or loosening the fasteners 131, if necessary. The strip perforations 122 can be slightly larger in diameter than the tray perforations 112.

The blanking strips 127 are adjusted to selectively cover and uncover a plurality of surplus perforations 112 on the decks 113a, 113b. This facilitates regulation of the flow of the heavy phase 100 through successive trays 111a, 111b, and facilitates rapid maintenance in response to plugging of active perforations. The strips 127 are adjusted to vary total available perforation area by sliding the strips laterally within a range of movement allowed by the positioning slots 128. Stabilizing the strips 127 with the fasteners 129 secures a selected total amount of exposed tray perforations 112 for stable operation. Individual trays can be independently adjusted to utilize differing portions of total installed perforation area. Alternatively, blanking strips 127 are disconnected and removed, in which case it is not necessary for the strips to include the perforations 122.

The above-described options for adjusting or removing blanking strips 127 enable clear tray perforations 112 to optionally be progressively placed in service when other perforations 112 become fouled. Coupling the excess tray perforation area with the blanking strips 127 also affords an expanded range of operating liquid flow conditions. This aspect allows a given vessel diameter to accommodate broader ranges of design flow rates than are typically possible with fixed active passage areas for a dispersedphase fluid. In retrofit applications, as further described below, the blanking strips facilitate designing for a set of target conditions, and having a degree of built-in flexibility to "tune" the resulting retrofit for optimal performance.

Figure 9:
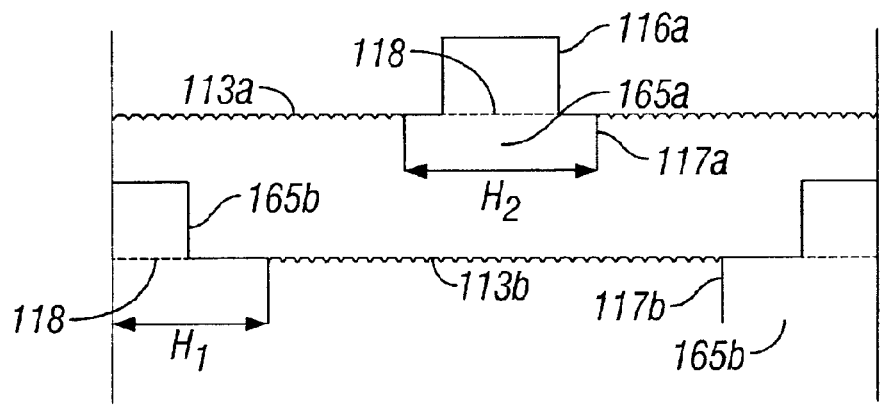
FIG. 9 shows a cross-section of two-pass sieve trays in elevation.
Figure 10:
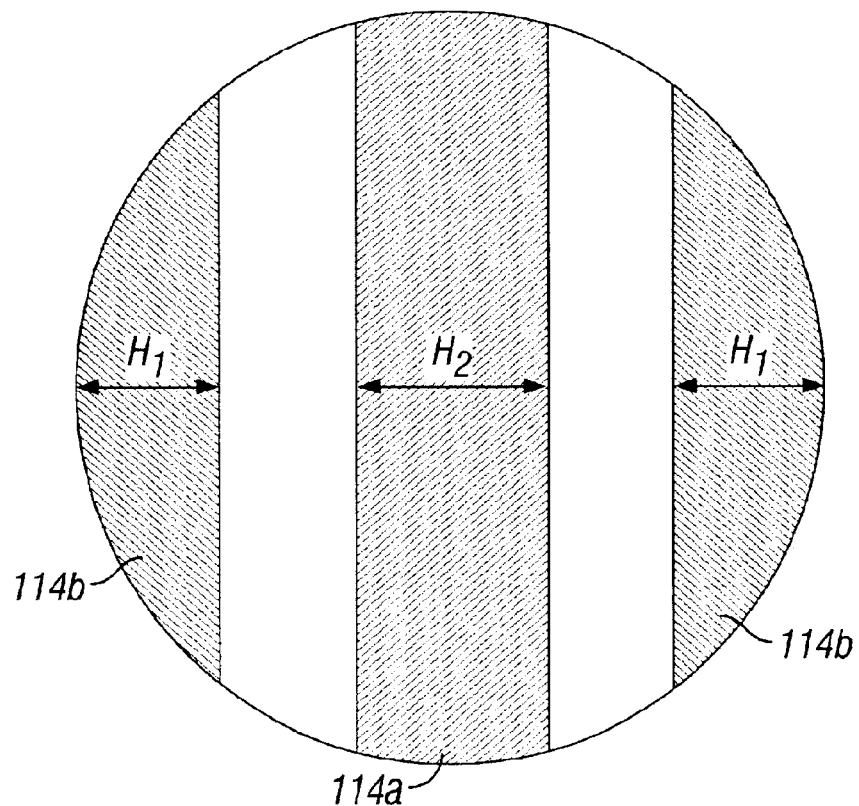
FIG. 10 shows a plan view of the sieve tray arrangement of FIG. 9 to illustrate relative proportions of tray bottom risers.

In one exemplary embodiment of the invention, the heavy-phase feed stream 100 is a lubricating oil feed-stock with asphaltene compounds as a component fraction of the feedstock. FIGS. 9–10 depict approximate proportional riser layouts for this application using the tray configurations of FIGS. 1–3. In this embodiment the light-phase feed stream 115 is a solvent, preferably from the homologous family of propane through pentane aliphatic and cycloaliphatic hydrocarbons, to selectively extract non-asphaltene fractions of the feed stream 100. In this application, a ratio of volumetric flow rate of the light phase feed 115 to the heavy phase feed 100 is greater than 1:1, preferably from 5:1 to 15:1, and more preferably from 6:1 to 10:1.

The deasphalting produces a light-phase effluent 125 as an extract carrying a major portion of the solvent feed stream, e.g. more than 50 percent, and with dissolved heavy-phase constituents comprising a major portion of the lubricating oils and other non-asphaltene fractions from the feedstock. The heavy-phase effluent 135 from the process is treated raffinate carrying a major portion of the asphaltenes from the feedstock, e.g. more than 50 percent, with minor fractions including unrecovered lubricating oils and a portion of the solvent.

By dispersing the minor phase, here the downward-flowing heavy phase 100, the present embodiment provides, first, supplemental perforations for active area of the tray decks 113a, 113b and, second, adjustable blanking strips 127 for matching useable active area with actual operating flow rates. These innovations make the extraction column fundamentally more flexible in total capacity and capable of operating longer periods between turnarounds for removing deposits from the occluded perforations.

In other embodiments, the methods of the invention are implemented while reversing the roles of the liquid phases, i.e., the heavy liquid feed stream 100 can be a solvent, and the light liquid feed stream 115 can be a raffinate. In this embodiment, the ratio of the volumetric flow rate of the light phase 115 to the volumetric flow rate of the heavy phase 100 has the same relative relationship described for the lubricating oil feedstock case. The heavy-phase effluent 135 leaving the lower outlet 140 of the extraction vessel 110 would thus be the extract and, correspondingly, the light-phase effluent 125 leaving the upper outlet 130 of the extraction vessel 110 would be the treated raffinate. The methods of this invention are designed to accommodate higher volumetric flow rates of the light phase 115 than of the heavy phase 100, independent of the process function of either liquid phase.

Figure 11:
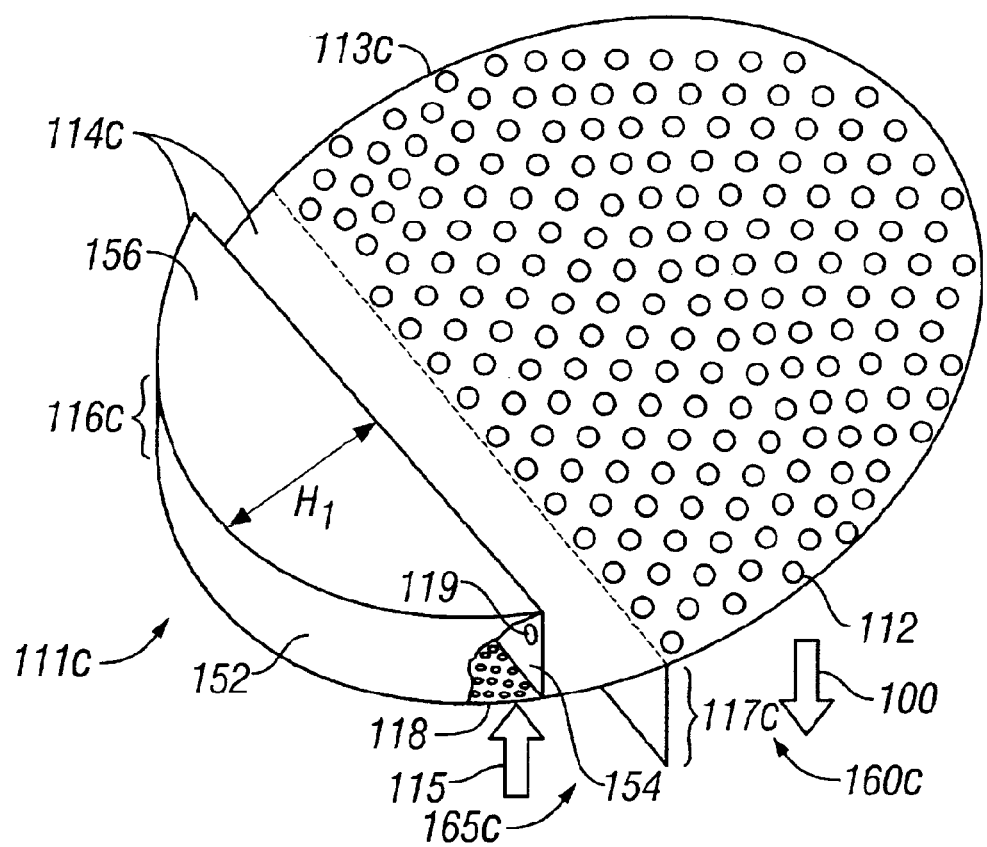
FIG. 11 represents a perspective view, partially cut away, of a simplified embodiment of a sieve tray with a peripheral single-pass riser.

The tray installations discussed above and depicted in FIGS. 1–4 and 9–10 generally embody an alternating sequence of single and dual risers 114a, 114b in a two-pass mode. Another configuration can use a single-riser tray design of single-pass mode, such as shown in FIG. 11. A plurality of single-pass sieve trays 111c can be vertically arrayed in an extraction vessel (not shown), wherein each tray has one riser 114c vertically intersecting the tray 111c and laterally disposed near a tray edge. Successive single-pass trays 111c can be stacked vertically, wherein each successive tray is rotated 180 degrees in a horizontal plane with respect to an adjacent tray. The successive rotations orient respective risers 114c adjacent opposite sides of a vertical axis of an extraction vessel (not shown) with respect to a riser of an adjacent tray. The single-pass risers 114c include a top riser section 116c and a bottom riser section 117c, attached respectively above and below a plane of the tray 111c, and conjoined at the tray surface by a restrictor plate 118 in the plane of the tray 111c. The top riser section 116c can include a solid vertical surface 152 more or less concentric with and adjacent the stripping vessel wall (not shown), a perforated vertical surface 154 transecting a cord of the tray 111c, and a top solid surface 156, with all three riser surfaces connected to form the top riser section 116c enclosed above and laterally. The transecting surface 154 is perforated with a row of openings 119 adjacent a top edge of the surface 154. An area of the tray 111c includes a deck 113c with a plurality of perforations 112. A cross-flow zone 160c is disposed beneath each tray perforated deck 113c, and adjacent a disengagement zone 165c that is beneath the tray 111c under and/or within the bottom riser section 117c.

In this single-pass configuration the heavy-phase liquid 100 follows a flow path generally axially downward through successive trays 111c. The continuous light-phase liquid 115 follows a flow path laterally through cross-flow zones 160c beneath successive trays 111c, then upward through respective tray risers 114c, and discharging generally horizontally through the top riser openings 119 into succeeding cross-flow zones 160c. In these flow paths the heavy phase 100 is repeatedly collected, coalesced, and dispersed by successive trays 111c, falling successively through the light phase 115 in single-pass contact in the respective cross-flow zones 160c.

Figure 12:
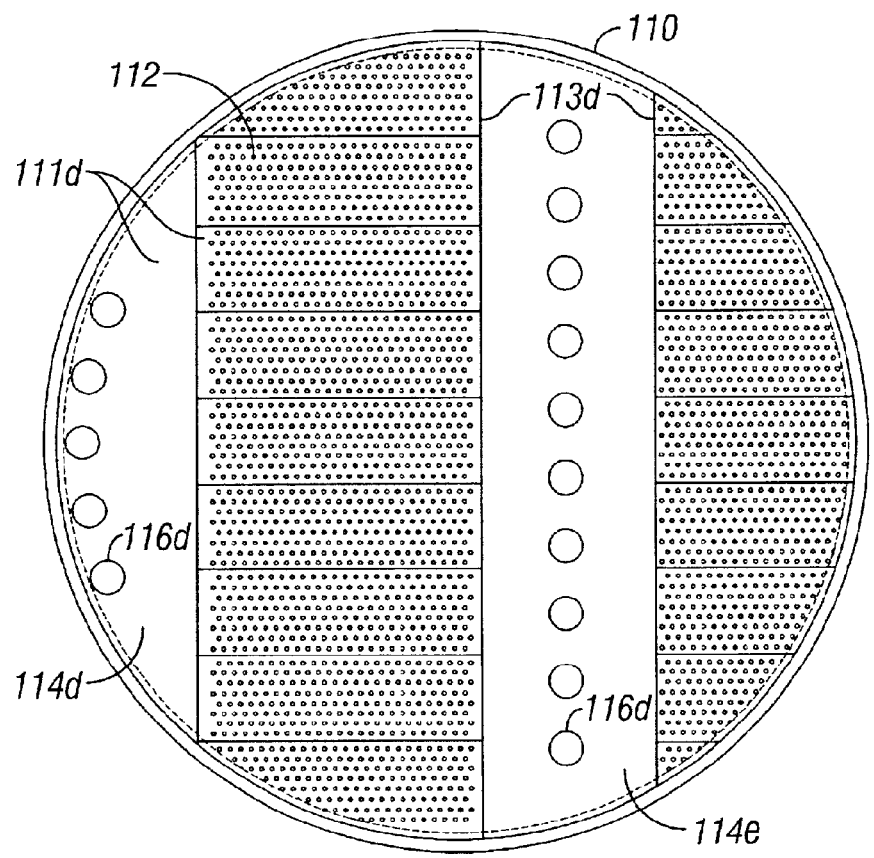
FIG. 12 is a plan of a sieve tray with midsection-peripheral three-pass risers according to the invention wherein the risers comprise a plurality of pipes or conduits of reduced diameter.
Figure 13:
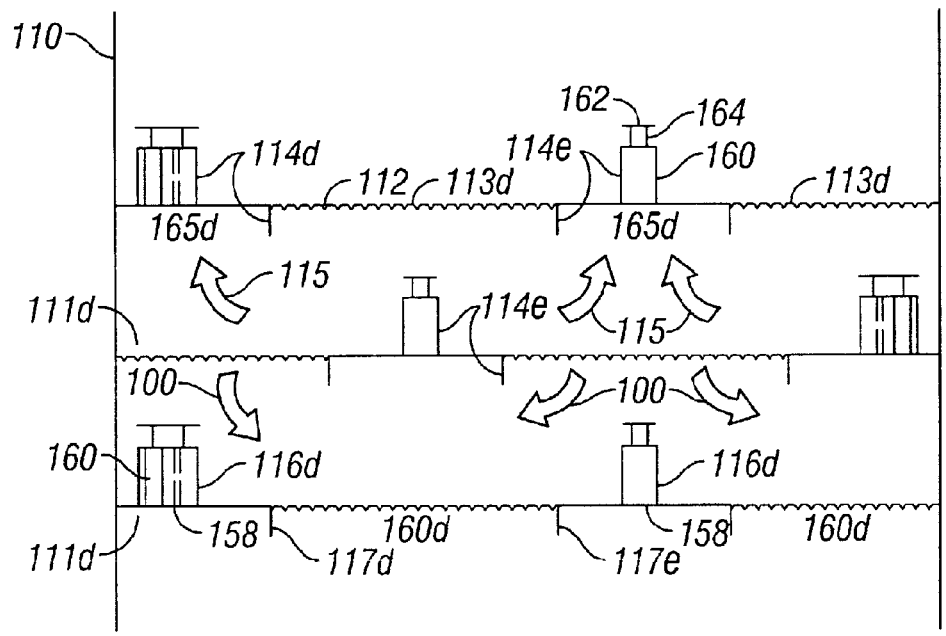
FIG. 13 is an elevation of a plurality of the sieve trays of FIG. 12 in an alternating arrangement in an extraction unit.

Another sieve tray configuration embodiment integrates aspects of riser elements from FIGS. 2–3 in a three-pass mode as depicted in FIGS. 12–13. As above, a plurality of three-pass sieve trays 111d, such as shown in plan and elevation in FIGS. 12–13, can be vertically arrayed in an extraction vessel 110, wherein each successive three-pass tray 111d is rotated 180 degrees in a horizontal plane with respect to an adjacent tray 111d.

The three-pass tray 111d uses dual riser banks 114d, 114e, wherein the risers 114d, 114e vertically intersect respective trays 111d. A first riser bank 114d is laterally disposed near a tray edge. A second riser bank 114e is offset horizontally from and aligned generally parallel to the first riser bank 114d. Successive tray rotations orient the respective edge risers 114d on opposite sides of a vertical axis of the extraction vessel 110 with respect to the edge riser of an adjacent tray. The three-pass risers 114d, 114e include a top riser section 116d and bottom riser sections 117d, 117e, respectively above and below a plane of the tray 111d. The top and bottom riser sections 116d, 117d, 117e are connected through openings 158 in the tray surface. The bottom risers 117d, 117e form transverse channels beneath the trays 111d.

The connections joining the top and bottom risers 116d, 117d, 117e (see FIG. 13) have a diameter or cross-section sufficiently reduced to inhibit the flow of the light-phase fluid and thus can avoid the need for restrictor plates. Alternative three-pass trays depicted in FIGS. 14–15 use relatively larger top risers 116d, 116e, and the orifices in the respective restrictor plates create a pressure drop to regulate the light-phase flow rate.

Figure 14:
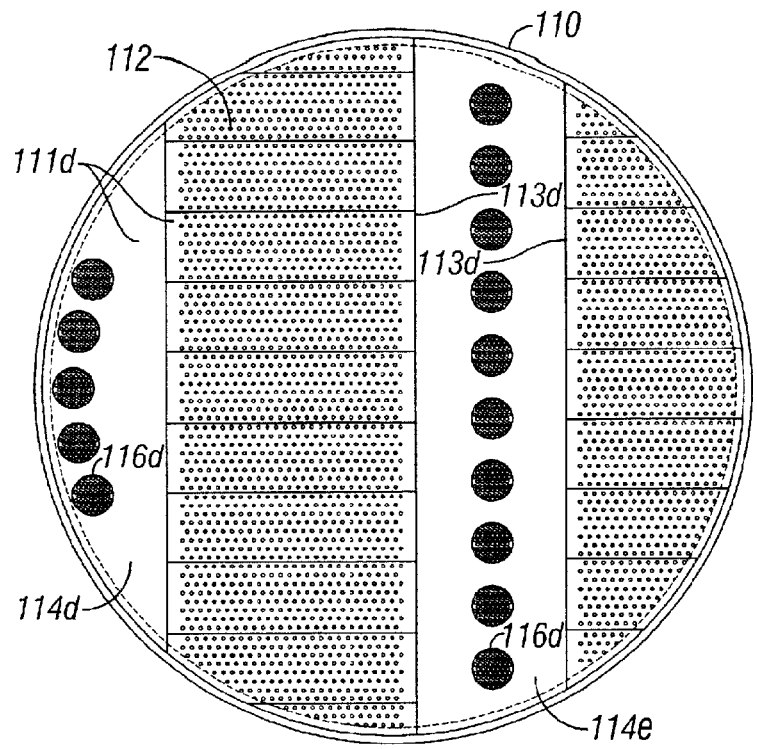
FIG. 14 is a plan of a sieve tray with midsection-peripheral three-pass risers according to the invention wherein the risers comprise a plurality of pipes or conduits of enlarged diameter with restriction orifices.

As shown in FIGS. 12–15, the top risers can optionally comprise one sectional stack 116e (FIG. 15) or a plurality of discrete, separated stacks 116d having various crosssections (FIGS. 12–14). Alternative riser cross-sectional shapes can be used as determined by consideration of fluid mechanics, accessibility, or fabrication economics. As shown in FIG. 13 (and FIG. 19 discussed below), each top riser section 116d includes an open vertical duct 160 with an imperforate cap 162 attached by brackets 164. The caps 162 direct the light-phase fluid laterally and inhibit entry of heavy-phase fluid. The caps 162 can have an outwardly sloped upper surface to inhibit accumulation and facilitate movement of the heavy-phase fluid on top of the caps 162. For clarity, caps 162 are omitted from the plan views of FIGS. 12 and 14–17.

An area of the three-pass tray 111d includes a plurality of panels connected edgewise to one another and to adjacent tray risers 114d, 114e, to form an integral deck 113d with a plurality of perforations 112. A cross-flow zone 160d is disposed beneath each tray perforated deck 113d, and adjacent a disengagement zone 165d that is beneath the tray 111d adjacent the bottom riser section 117d.

Figure 15:
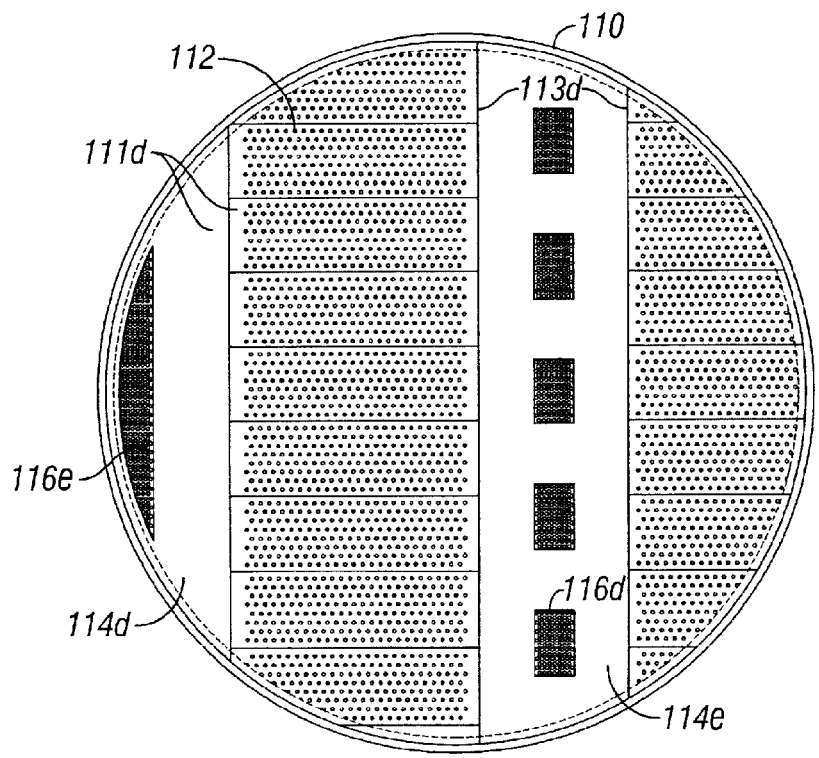
FIG. 15 is a plan of a sieve tray with midsection-peripheral three-pass risers according to the invention wherein the risers comprise a plurality of conduits of non-circular cross-section with restriction orifices.
Figure 16:
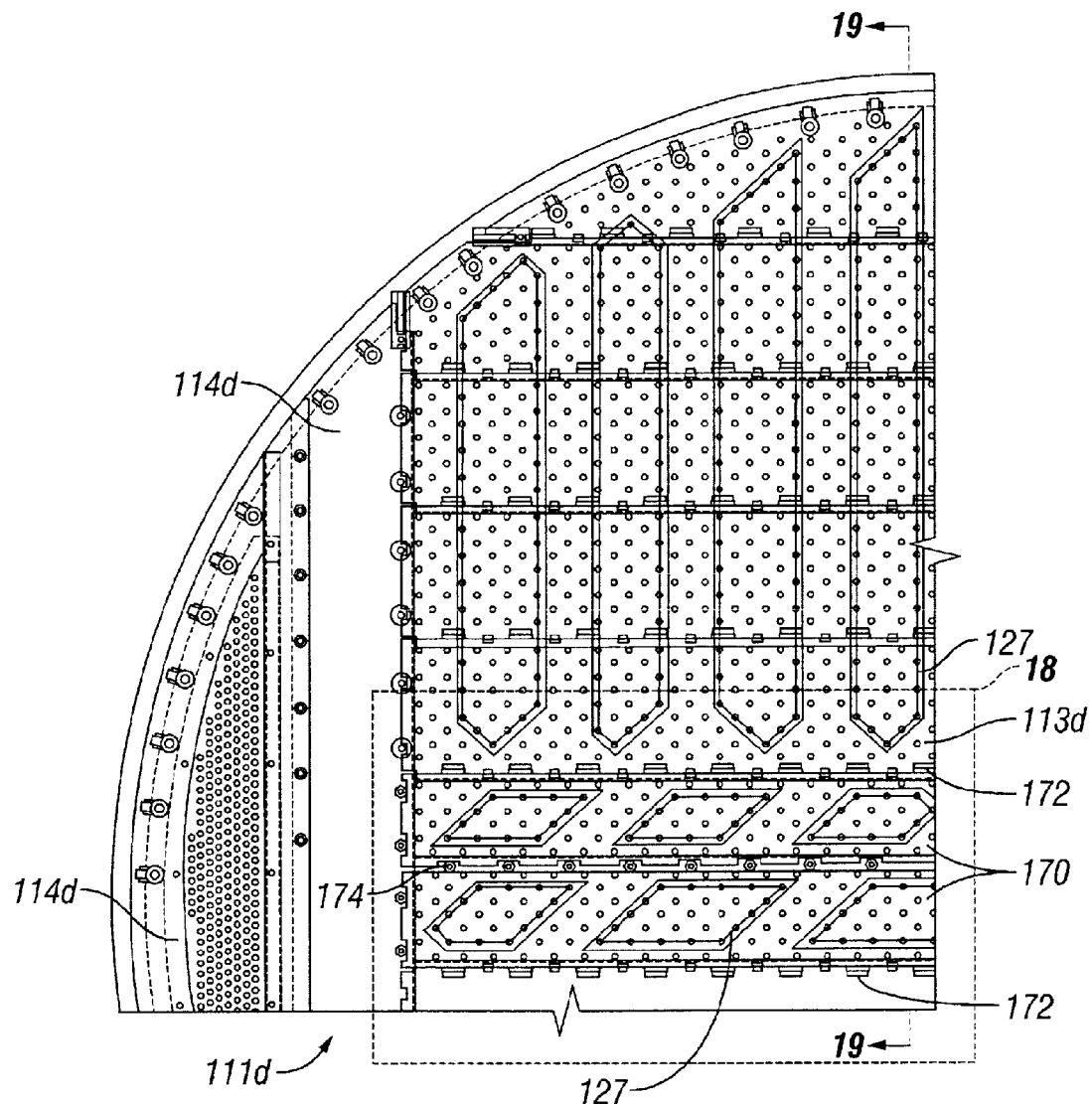
FIG. 16 depicts a plan view of a portion of a sieve tray showing blanking strips and a manway access hatch integrated in relatively large panels of the three-pass tray deck of the FIG. 15 design.
Figure 17:
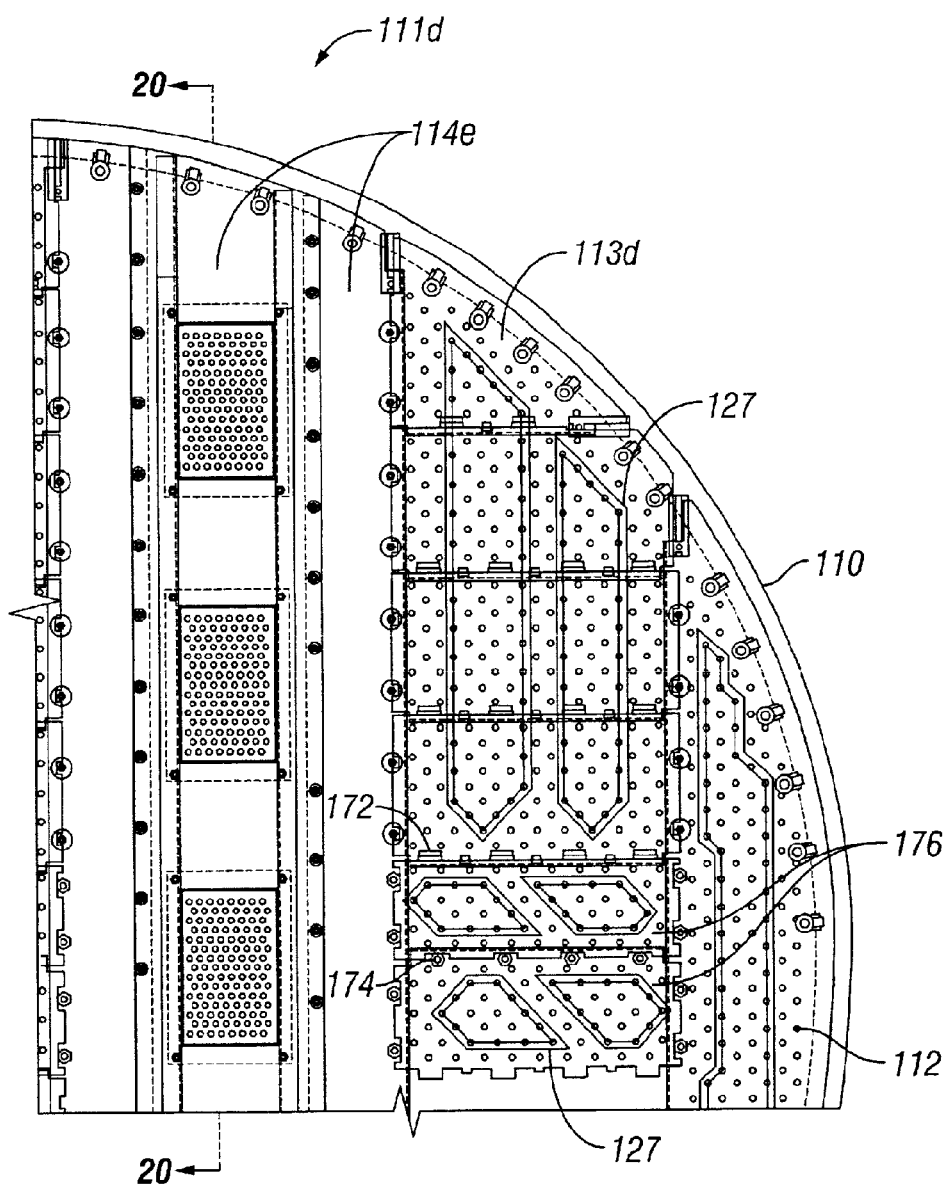
FIG. 17 depicts a plan view of another portion of the three-pass sieve tray of FIG. 15.
Figure 18:
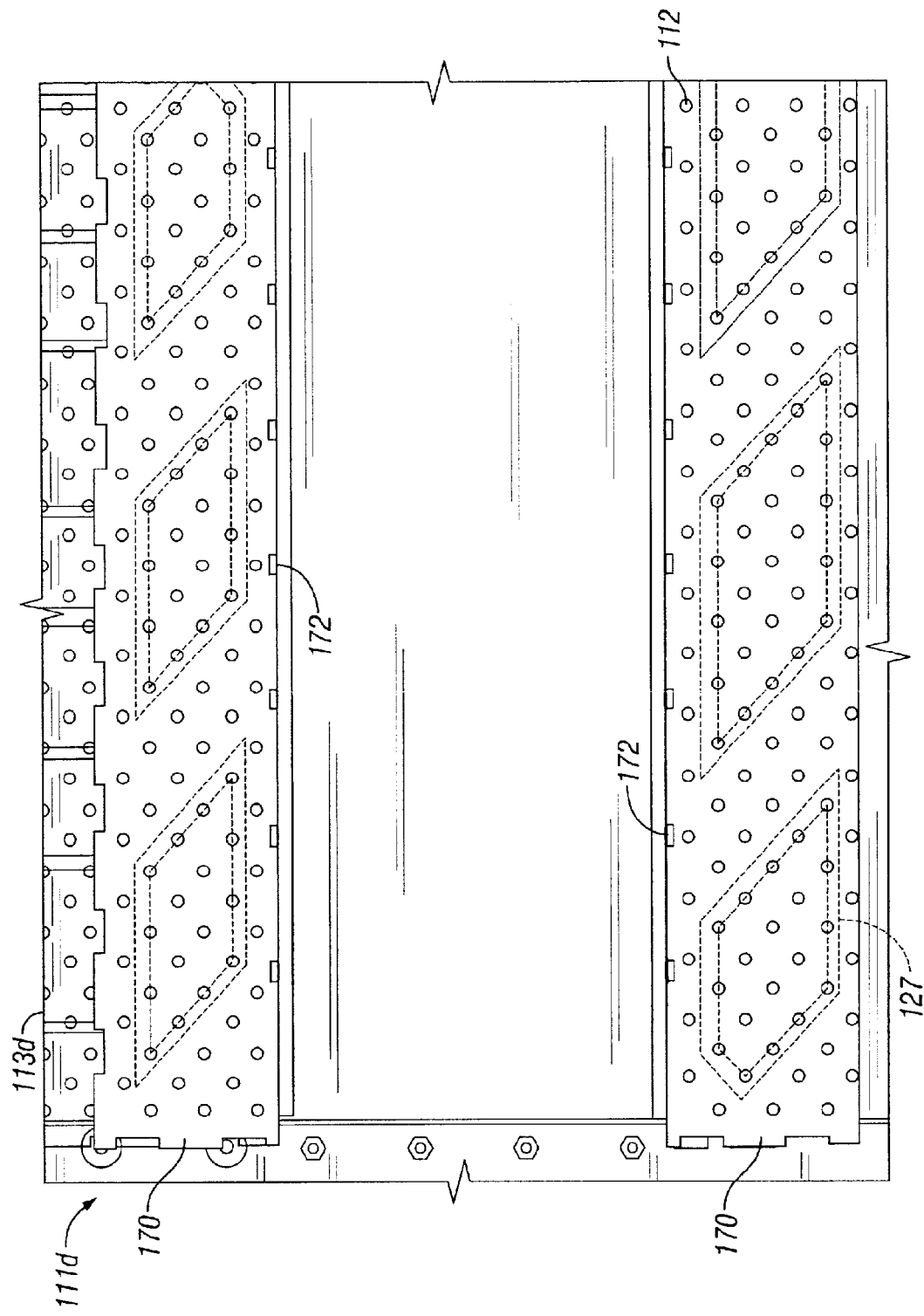
FIG. 18 is an enlarged view of area 18 in FIG. 16, depicting the manway hatch in an open position.

FIGS. 16–18 depict selected details of an embodiment of a three-pass tray configuration to illustrate overall use of tray area for blanking strips and installation of access hatches. For general orientation, FIG. 16 corresponds approximately to an upper-left quadrant of a tray 111d as represented in FIG. 15, and FIG. 17 to the opposite upperright quadrant. In FIG. 16 blanking strips 127 are more or less uniformly allocated across a perforated tray deck area 113d, in contrast to a distribution such as shown in FIGS. 7-8 favoring margins of the tray decks 113a, 113b.

In FIG. 16 a pair of relatively large manway access hatches 171 are mounted in the perforated tray deck 113d. The deck 113d also includes a plurality of fixed panels disposed transversely between an edge riser 114d and a horizontally offset riser 114e, extending between the hatches 70 and an outer edge of the deck 113d. Blanking strips 127 can also be allocated to the manway hatches 170. The hatches 171 are each attached to the tray deck 113d along respective rows of laterally opposed hinge elements 172 for easy opening, and the hatches 171 are fixed in closed position, as illustrated in FIG. 16, by a row of hatch fasteners 174 along adjoining edges of the hatches 171. In FIG. 17 relatively smaller manway hatches 176 are preferably disposed in panels of the perforated deck 113d between a horizontally offset second tray riser 114e and a tray edge.

The manway hatches 171, 176 of FIG. 16 and FIG. 17, respectively, can be installed in alternating successive trays, and the respective trays can be installed in an extraction column in alternating 180-degree rotation in respect to one another. As a result of this installation pattern, manway hatches 171 and 176 will be oriented to overlap in more or less vertical alignment from tray to tray in an extraction column to facilitate personnel access.

FIG. 18 depicts one of the relatively larger manway access hatch pairs 171 in an open position, in reference to area 18 of FIG. 16. According to the tray-to-tray orientation described above, the open manway hatches 171 of FIG. 18 more or less align above the relatively smaller access hatches 176 of a tray of the configuration of FIG. 17 so that personnel can move serially between the trays. It will be appreciated that the installation of the manway hatches 171, 176 in the perforated decks is possible due to the presence of just one or two risers in each tray and the overall diameter of the trays.

FIG. 19 shows the interlocking tabs 178 between the adjacent decking panels of FIG. 16. An anchor ring 180 is attached to a wall of the extraction vessel 110 to facilitate positioning and supporting the tray 111d. FIG. 20 shows a stabilizing bracket 182 structurally connecting the discrete top riser stacks 160 and the anchor ring 180. The interlocking tabs 178 allow the perforated deck to be assembled using multiple panels for perforated decks 113a–d and risers 114a–e. The stabilizing bracket 182 facilitates structural stiffening of the trays and a uniform elevation.

The invention can be advantageously applied to retrofit existing liquid-liquid extraction units without constructing substantially new units. In a preferred embodiment, this is done by selectively replacing respective internal components of an existing system with the inventive sieve tray components described above. This application of the invention is of practical and economic interest in existing facilities for which the present invention offers improvements to liquid carrying capacities, extraction efficiencies, maintainability, or a combination thereof, compared to existing methods. As noted above, for example, prior art rotating disc contactors (RDC) can be retrofit candidates due to historical difficulties with the mechanical reliability of RDC (e.g. leakage around rotating components) and process performance (e.g. phase entrainment/flooding or low efficiency due to inoperable RDC rotors, both conditions requiring reduction of throughput to maintain product quality).

Figure 21:
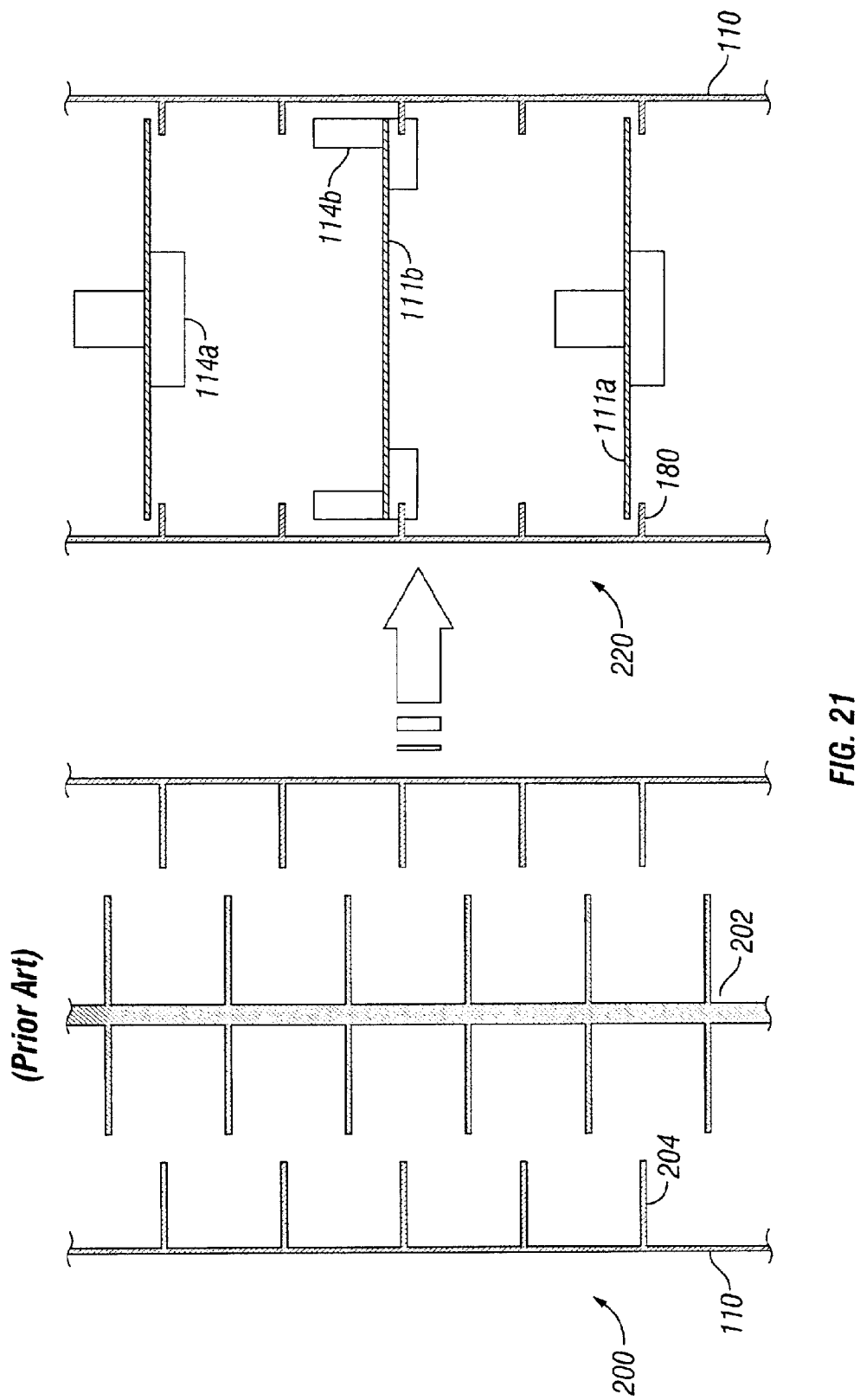
FIG. 21 illustrates a simplified retrofit conversion of a rotating disc contactor (shown on the left, prior art) to a tray column using a tray design of the present invention (shown on the right).

As shown generally in FIG. 21, an RDC unit 200 can be converted to a trayed column 220 using the principles of the present invention with relatively few major steps: This involves removing the RDC rotor shaft 202 and its appurtenances. Then, the RDC stators 204, which partially bridge an annular space between an extraction vessel wall 210 and the rotor shaft 202, are cut back to a reduced annular dimension (but remaining attached to the vessel wall) and used as structural support rings 180 for attachment of trays 111a, 111b. The conversion illustrated in FIG. 21 can be referred to as a "1 for 2" retrofit since a new sieve tray is installed on every other stator 204. An important benefit to fabrication costs in such a case is that cutting or welding on the vessel wall 210 can be avoided.

The present invention is advantageously used with a ratio of volumetric flow rates of light-phase to heavy-phase in a general range from 1.5:1 to 15:1. As described above for lubricating oil extraction, for example, narrower values of this range of ratios are determined by a process of selecting a particular solvent to effect an extraction from a particular raffinate, considering the design performance specification for the extraction. Design specifications typically entail, for example, defining production rates and a degree of separation; balancing capital and operating costs; achieving target product purities while minimizing downstream/upstream processing costs (e.g. for waste disposal and solvent regeneration); and other factors pertaining to construction and performance of processes.

Accordingly, designing a particular application for this invention can involve specifying a number of trays, tray spacing, sizes of risers, and a schedule of tray areas and perforations to satisfy a design specification, e.g. liquid flow rates, feed conditions, and separation performance. A design practice will account for respective physical and chemical properties of particular light and heavy phases for such application.

EXAMPLE 1

The present invention can be compared to alternative methods for liquid-liquid extraction in applications both as grassroots process designs and as retrofits to existing systems. For deasphalting of lubricating oil (lube oil) feedstocks, the prior art has used rotating disc contactors (RDC's) and packed-bed extraction vessels. Table 1 compares the present invention with RDC's using estimates of performance for selected operating parameters.

TABLE 1

Performance Estimates for Solvent Deasphalting In Present Invention Relative to Rotating Disc Contactor Baseline

| Parameter | Performance of Present Invention |
| --- | --- |
| Liquid Capacity | 20–35% throughput increase |
| Extraction Efficiency | 2 times RDC |
| Product Yield | 0.5–5 volume percent increase |
| Operating Cost | Lower |
| Investment Cost | Lower |

RDC's consume energy to drive the disc contactors, which are not required in the present invention. Also, given an advantage in separation efficiency and capacity for the present invention, an RDC unit must consume extra power to increase liquid pumping rates to yield equivalent product quantity and quality. Therefore, the present invention incurs lower operating costs by operating at reduced liquid throughput loads and by avoiding the disc-drive power costs, when comparing the two technologies at common bases of liquid throughput and product quality.

Similarly, given the advantage in separation efficiency and capacity for the present invention versus an RDC, the RDC unit requires a proportionally larger vessel volume. The added volume is needed for an RDC to operate at higher gross liquid rates and contact times required to achieve a quantity and quality of product equal to the present invention. RDC's also feature added rotating disc drive equipment not needed in the present invention. Therefore, by eliminating the extra vessel size and RDC drive components, the present invention offers savings in initial costs of fabrication and construction, yielding lower capital costs.

EXAMPLE 2

To illustrate a range of retrofit options, Table 2 lists six cases of design dimensions for a lube oil solvent deasphalting application using the design of FIGS. 1–4, with reference to FIGS. 9–10 for simplified diagrams of sieve trays relating to dimensions in Table 2. The cases are for a potential retrofit of an existing RDC unit.

TABLE 2

RDC RETROFIT CASES

Common Bases: Heavy liquid flow = 93 m³/h
Light liquid flow = 306 m³/h

| Parameter | Option 1 | Option 2 | Option 3 | Option 4 | Option 5 | Option 6 |
|---|---|---|---|---|---|---|
| Vessel ID, m | 3.6 | 3.6 | 3.6 | 3.6 | 3.6 | 3.6 |
| Vessel Area, m² | 10.18 | 10.18 | 10.18 | 10.18 | 10.18 | 10.18 |
| Riser Area, m² | 2.75 | 3.26 | 3.56 | 3.87 | 4.28 | 5.00 |
| Riser Area, % of Vessel | 27 | 32 | 35 | 38 | 42 | 49 |
| Deck Area, m² | 7.43 | 6.92 | 6.62 | 6.31 | 5.90 | 5.18 |
| Perforation Area, m² | 0.042 | 0.056 | 0.084 | 0.168 | 0.248 | 0.112 |
| Perforation Diameter, mm | 6 | 8 | 9.5 | 13 | 19 | 25 |
| Perforation Count Per Tray | 1498 | 1124 | 1183 | 1266 | 874 | 229 |

A common basis in Table 2 is that each option at least meets the product specification of the RDC unit targeted for retrofit. In meeting the product specifications, the inventive options offer design-capacity increases in fluid throughput ranging from 33 percent to 108 percent of a nominal historical capacity of the RDC unit. In each case, the inventive options also offer a maximum capacity rated at about a 20–35 percent margin over the design basis capacity for each option. The combined gain in design capacity and design margin in the extraction unit also reflects a collateral benefit in undertaking such retrofit in the form of a potential for further improving overall plant productivity, for example by debottlenecking upstream or downstream systems in ways that may have been infeasible with existing extraction performance.

EXAMPLE 3

An extraction vessel conceptually similar to that shown in FIG. 1 is used in a liquid-liquid extraction process to remove asphaltene compounds from a lubricating oil raffinate feed stream, using propane as a solvent. Table 3 provides ranges of values for the compositions of the feed, extract, and raffinate product streams.

A lube oil feed stream is introduced as the heavy-phase liquid 100, entering the upper inlet 105 at a temperature of 100–250° F. The feed contains 50–90 volume percent asphaltene constituents. Simultaneously, propane is introduced at the lower inlet 120 at a flow rate of 5 to 15 times the volumetric flow of the feed and a temperature of 100–200° F. The extraction is operated with a temperature differential of 0–40° F. with respect to the oil feed temperature. The vessel 110 is operated at 2.75–4.8 MPa (400–700 psig). The raffinate product 135 is withdrawn at the bottom outlet 140 of the vessel 110 and contains a major fraction of the asphaltenes. An extract phase 125 is withdrawn from the top outlet 130 and contains a major fraction of the lube oil from the feed.

TABLE 3

| | Volume Percent Composition of Process Streams | | |
|---|---|---|---|
| Component | Feed | Extract | Raffinate |
| Asphaltenes | 50–90 | nil | 50 |
| Lube Oil Fraction | 10–50 | 1–11 | nil |
| Propane | nil | 89–99 | 50 |

The invention is described above with reference to non-limiting examples provided for illustrative purposes only. Various modifications and changes will become apparent to the skilled artisan in view thereof. It is intended that all such changes and modifications are within the scope and spirit of the appended claims and shall be embraced thereby.

What is claimed is:

1. A liquid-liquid extraction method for contacting a relatively heavy liquid phase with a relatively light liquid phase, comprising:
   introducing a feed stream of the heavy phase for downward flow at a volumetric flow rate at an upper inlet of a liquid-liquid extraction vessel comprising a plurality of successive, vertically-arrayed trays including at least one perforated deck per tray and at least one riser per tray, wherein the risers include respective top and bottom sections, wherein the bottom riser sections have larger transverse cross-sectional areas than respective top riser sections;
   introducing a feed stream of the light phase into a lower inlet of the extraction vessel for upward flow as a continuous phase at a volumetric flow rate greater than the heavy phase flow rate;
   passing the heavy phase through perforations in the decks of successive trays to disperse droplets of the heavy phase into respective cross-flow zones below the decks;
   collecting the heavy phase on respective upper surfaces of the successive decks;
   passing the light phase through respective cross-flow zones into adjacent disengagement zones and through the respective risers to discharge into succeeding cross-flow zones.

2. The method of claim 1, further comprising contacting the heavy and light phases above an uppermost one of the trays by:
  distributing the heavy-phase feed stream adjacent the upper inlet across an upper distribution zone;
  passing the light phase upwardly from the at least one riser of the uppermost tray for countercurrently contacting the heavy phase in the upper distribution zone;
  passing the light phase upwardly from the upper distribution zone into an ultimate disengaging zone for separating heavy-phase droplets into the upper distribution zone, and for withdrawing from the disengaging zone the light phase essentially free of entrained heavy phase;
  discharging the light phase as an effluent from an upper outlet of the extraction vessel in communication with the disengaging zone.

3. The method of claim 1, further comprising contacting the heavy and light phases below a lowermost one of the trays by:
  distributing the light-phase feed stream adjacent the lower inlet across a lower distribution zone;
  passing the heavy phase downwardly from the lowermost tray into the lower distribution zone for countercurrently contacting the light phase in the lower distribution zone;
  passing the heavy phase downwardly from the lower distribution zone to an accumulation zone for coalescing the heavy phase essentially free of entrained light phase;
  discharging the heavy phase as an effluent from a lower outlet of the extraction vessel in communication with the accumulation zone.

4. The method of claim 1, further comprising constraining the upward flow of the light phase through respective trays with flow restrictions in the risers.

5. The method of claim 4 wherein the flow restrictions comprise a restrictive cross-sectional area of the at least one top riser of the tray.

6. The method of claim 4 wherein the flow restrictions comprise a perforated restrictor plate between the top and bottom riser sections.

7. The method of claim 1, further comprising alternating configurations of the risers on the successive trays wherein the risers comprise single-pass peripheral risers.

8. The method of claim 1, further comprising alternating configurations of the risers on the successive trays wherein the risers comprise midsection-peripheral two-pass risers.

9. The method of claim 1, further comprising alternating configurations of the risers on the successive trays wherein the risers comprise midsection-peripheral three-pass risers.

10. The method of claim 1, wherein a ratio of the volumetric flow rate of the light phase to the volumetric flow rate of the heavy phase is in a range from 1.5:1 to 15:1.

11. The method of claim 1, wherein the heavy liquid phase comprises solvent and the light liquid phase comprises raffinate.

12. The method of claim 1, wherein the heavy liquid phase comprises raffinate and the light liquid phase comprises solvent.

13. The method of claim 12, wherein:
  the heavy-phase feed stream comprises lubricating oil feedstock containing asphaltenes;
  the light-phase feed stream comprises solvent selected from aliphatic or cycloaliphatic hydrocarbons having from 3 to 5 carbon atoms; and
  a ratio of the volumetric flow rate of the light phase to the volumetric flow rate of the heavy phase is in a range from 6:1 to 10:1.

14. The method of claim 1, further comprising:
  securing removable blanking strips to the tray decks to block a first portion of the tray perforations and leave a second portion of the perforations unobstructed for said heavy phase passage;
  removing at least one of the blanking strips to pass the heavy phase through unobstructed perforations of the first portion.

15. The method of claim 1, further comprising:
  securing adjustable blanking strips to the tray decks to selectively block and unblock at least a portion of the tray perforations;
  adjusting the blanking strips to increase or reduce the rate of passage of the heavy phase through the respective portions of the tray perforations.

16. A liquid-liquid extraction unit for contacting a heavy liquid phase with a light liquid phase, comprising:
  means for introducing a feed stream of the heavy phase for downward flow at a volumetric flow rate entering an upper inlet of a liquid-liquid extraction vessel comprising a plurality of successive, vertically-arrayed trays including at least one perforated deck per tray and at least one riser per tray, wherein the risers include respective top and bottom Sections, wherein the bottom riser sections have larger transverse cross-sectional areas than respective top riser sections;
  means for introducing a feed stream of the light phase into a lower inlet of the extraction vessel, for upward flow as a continuous phase at a volumetric flow rate greater than the heavy phase flow rate;
  means for passing the heavy phase through an adjustable portion of the perforations in the decks of successive trays to disperse droplets of the heavy phase into respective cross-flow zones below the decks;
  means for collecting the heavy phase on respective upper surfaces of the successive trays;
  means for passing the light phase through respective cross-flow zones into adjacent tray disengagement zones and through the respective risers to discharge into succeeding cross-flow zones.

17. A liquid-liquid extraction vessel comprising:
  an upper inlet to the extraction vessel to introduce a feed stream of a heavy phase at a volumetric flow rate;
  a plurality of successive, vertically-arrayed trays including at least one perforated deck per tray and at least one riser per tray, wherein the risers include respective top and bottom sections, wherein the bottom riser sections have larger transverse cross-sectional areas than respective top riser sections, and wherein a tray is imperforate in an area of the riser bounded between attachments of the respective top and bottom riser sections to the tray;
  a lower inlet to the extraction vessel to introduce a feed stream of a light phase at a greater volumetric flow rate than the heavy phase;
  perforations in the tray decks to pass the heavy phase downward to disperse droplets of the heavy phase into a continuum of the light phase;
  cross-flow zones below the respective tray decks to pass the heavy-phase droplets downwardly through the respective cross-flow zones;
  collection zones below the respective cross-flow zones to coalesce the heavy-phase droplets on respective upper surfaces of successive decks;

disengagement zones under the bottom sections of the risers to receive the light-phase from the cross-flow zones and disengage entrained heavy phase droplets; and structure associated with the tray decks to adjust the flow area of the perforations.

18. The liquid-liquid extraction vessel of claim 17, further comprising:

a cylindrical shell having an inside diameter of at least 1.5 m;

wherein the trays are vertically spaced in the shell;

wherein a single one or a parallel pair of said risers are associated with each tray;

an exterior manway formed in a wall of the vessel adjacent to at least one of the trays; and a manway hatch formed in the perforated deck of each tray for personnel access to each of the trays.

19. The vessel of claim 18 wherein the manway hatches in each tray overlap in plan a manway hatch in an adjacent tray.

20. The vessel of claim 19 wherein the risers comprise alternating peripheral single-pass risers.

21. The vessel of claim 19 wherein the risers comprise alternating midsection-peripheral two-pass risers.

22. The vessel of claim 19 wherein the risers comprise alternating midsection-peripheral three-pass risers.

23. The vessel of claim 18 wherein the flow area adjusting structure comprises blanking strips removably secured to the perforated decks.

24. The vessel of claim 18 wherein the flow area adjusting structure comprises blanking strips adjustably secured to the perforated decks.

25. The vessel of claim 18 wherein the perforated decks comprise an assembly of a plurality of panels.

26. The vessel of claim 18 wherein the risers include a perforated restriction plate between the top and bottom sections.

27. The vessel of claim 17, further comprising:

an upper distributor in communication with the upper inlet to distribute the heavy phase feed stream in the extraction vessel;

an upper distribution zone adjacent the upper distributor to contact the heavy and light phases in counter-current flow above an uppermost one of the trays;

an ultimate disengaging zone above the upper distribution zone to separate droplets of heavy phase from the light phase;

an upper outlet in communication with the disengaging zone to discharge light phase effluent from the extraction vessel.

28. The vessel of claim 17, further comprising:

a lower distributor in communication with the lower inlet to distribute the light phase in the extraction vessel;

a lower distribution zone adjacent the lower distributor to contact the heavy and light phases in counter-current flow below a lowermost one of the trays;

an accumulation zone disposed below the lower distribution zone to coalesce the heavy-phase droplets;

a lower outlet in communication with the accumulation zone to discharge heavy-phase effluent from the extraction vessel.

29. The vessel of claim 17, further comprising flow restrictions in the risers to constrain the upward flow of light phase through respective trays.

30. The vessel of claim 29 wherein the restrictions comprise a restrictive cross-sectional area of the top risers.

31. The vessel of claim 29 wherein the restrictions comprise a perforated horizontal restrictor plate disposed in each riser.

32. The vessel of claim 29, further comprising directional passages in the risers to direct the flow of the light phase from the riser top sections laterally into respective cross-flow zones.

33. The vessel of claim 32 wherein the directional passages comprise a horizontal slot formed between a transverse cap attached above an open-ended riser stack and a top edge of the open riser.

34. The vessel of claim 33 wherein the directional passages comprise a plurality of side-facing openings in a vertical wall of a closed-ended riser stack.

35. The vessel of claim 17, wherein the risers comprise single-pass peripheral risers alternatingly disposed between opposite sides on the successive trays.

36. The vessel of claim 17, wherein the risers comprise midsection-peripheral two-pass risers alternatingly disposed on the successive trays.

37. The vessel of claim 17, wherein the risers comprise midsection-peripheral three-pass risers alternatingly disposed on the successive trays.

38. The vessel of claim 17, wherein the flow area adjusting structure comprises blanking strips removably secured to the perforated deck surfaces to selectively block portions of the perforations.

39. The vessel of claim 17, wherein the flow area adjusting structure comprises blanking strips adjustably secured to the perforated deck surfaces to selectively block and unblock portions of the perforations.

40. The vessel of claim 17, further comprising personnel access hatches in the perforated tray decks wherein access panels of adjacent trays overlap in plan.

* * * * *